(12) United States Patent
Hiranaga et al.

(10) Patent No.: US 7,954,647 B2
(45) Date of Patent: *Jun. 7, 2011

(54) FILTERS

(75) Inventors: Hajime Hiranaga, Tsukuba-gun (JP); Tatsuya Hoshino, Ushiku (JP)

(73) Assignee: Pall Corporation, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/698,080

(22) Filed: Jan. 26, 2007

(65) Prior Publication Data

US 2007/0119772 A1    May 31, 2007

Related U.S. Application Data

(62) Division of application No. 10/275,860, filed as application No. PCT/US01/15373 on May 14, 2001, now Pat. No. 7,195,122.

(60) Provisional application No. 60/203,948, filed on May 12, 2000, provisional application No. 60/216,697, filed on Jul. 7, 2000.

(51) Int. Cl.
*B01D 27/08* (2006.01)

(52) U.S. Cl. ........ 210/436; 210/440; 210/443; 210/453; 210/454; 210/455; 210/456; 210/472; 210/493.2

(58) Field of Classification Search .................. 210/232, 210/436, 440, 443, 444, 453, 455, 456, 472, 210/493.2, 454

See application file for complete search history.

(56) References Cited

U.S. PATENT DOCUMENTS

| | | | |
|---|---|---|---|
| 1,791,046 | A | 2/1931 | Sweetland |
| 2,630,919 | A | 3/1953 | Tyler |
| 3,684,100 | A | 8/1972 | Close |
| 3,695,446 | A | 10/1972 | Lyall et al. |
| 3,734,851 | A | 5/1973 | Matsumura |
| 3,935,106 | A | 1/1976 | Lipner |
| 4,174,231 | A | 11/1979 | Hobgood |
| 4,187,179 | A | 2/1980 | Harms |
| 4,414,109 | A | 11/1983 | Authur |
| 4,456,529 | A | 6/1984 | Shinaver |
| 4,500,426 | A | 2/1985 | Ishii et al. |
| 4,568,456 | A | 2/1986 | van Zon |

(Continued)

FOREIGN PATENT DOCUMENTS

FR    2 310 501 A2    12/1976

(Continued)

OTHER PUBLICATIONS

LaRoux K. Gillepie, Deburring and Edge Finishing Handbook, 1999, Society of Manufacturing Engineers, p. 1.*

(Continued)

*Primary Examiner* — Matthew O Savage

(74) *Attorney, Agent, or Firm* — Leydig, Voit & Mayer, Ltd.

(57) ABSTRACT

A filter comprises a housing and a filter cartridge. The housing includes an inlet, an outlet, a vent, and a filter cartridge chamber. The filter cartridge is permanently positioned in the filter cartridge chamber of the housing with an annular channel between the filter cartridge and the housing. The bottom of the filter cartridge and the interior of the bottom of the housing each include a surface which inclines upwardly toward the annular channel.

27 Claims, 33 Drawing Sheets

U.S. PATENT DOCUMENTS

| | | | |
|---|---|---|---|
| 4,629,475 A | | 12/1986 | McArdle et al. |
| 4,678,577 A | | 7/1987 | Thomas et al. |
| 4,708,157 A | | 11/1987 | Sabatino |
| 4,719,012 A | * | 1/1988 | Groezinger et al. .......... 210/232 |
| 4,735,193 A | | 4/1988 | Kulprathipanja et al. |
| RE32,711 E | | 7/1988 | Dickens et al. |
| 4,879,032 A | | 11/1989 | Zemlin |
| 4,944,776 A | | 7/1990 | Keyser et al. |
| 4,966,699 A | | 10/1990 | Sasaki et al. |
| 5,039,406 A | * | 8/1991 | Whittington ............. 210/167.02 |
| 5,077,959 A | | 1/1992 | Wenzel |
| 5,085,772 A | | 2/1992 | Busch-Sørensen |
| 5,139,669 A | | 8/1992 | Clermont et al. |
| 5,160,042 A | | 11/1992 | Bikson et al. |
| 5,160,615 A | | 11/1992 | Takagi et al. |
| 5,192,499 A | | 3/1993 | Sakai et al. |
| 5,266,195 A | | 11/1993 | Hopkins |
| 5,346,177 A | | 9/1994 | Paulsen et al. |
| 5,354,464 A | | 10/1994 | Slovak et al. |
| 5,382,355 A | | 1/1995 | Arlozynski |
| 5,507,959 A | | 4/1996 | Glick |
| 5,653,871 A | | 8/1997 | Thomsen |
| 5,813,245 A | | 9/1998 | Coates et al. |
| 5,824,217 A | | 10/1998 | Pearl et al. |
| 5,944,990 A | | 8/1999 | Edens |
| 5,951,862 A | | 9/1999 | Bradford |
| 6,001,249 A | | 12/1999 | Bailey et al. |
| 6,048,454 A | * | 4/2000 | Jenkins ....................... 210/172.1 |
| 6,059,797 A | | 5/2000 | Mears |
| 6,068,770 A | * | 5/2000 | Niermeyer et al. ......... 210/321.6 |
| RE36,914 E | | 10/2000 | Carlsen et al. |
| 6,378,907 B1 | * | 4/2002 | Campbell et al. ................ 285/26 |
| 6,387,271 B1 | | 5/2002 | Geibel et al. |
| 6,733,250 B2 | | 5/2004 | Yajima |
| 6,902,671 B2 | | 6/2005 | Cappia et al. |
| 7,021,667 B2 | * | 4/2006 | Campbell et al. ................ 285/26 |
| 7,029,238 B1 | | 4/2006 | Zagars et al. |
| 7,037,424 B2 | * | 5/2006 | Niermeyer et al. ......... 210/321.6 |
| 7,163,037 B2 | | 1/2007 | Walkowski |
| 7,163,237 B2 | | 1/2007 | Niermeyer et al. |
| 7,195,122 B2 | * | 3/2007 | Hiranaga et al. ............... 210/436 |
| 7,296,582 B2 | * | 11/2007 | Campbell et al. ............. 134/22.1 |
| 7,350,831 B2 | * | 4/2008 | Shimizu ..................... 285/334.5 |
| 7,407,594 B2 | | 8/2008 | Laverdiere et al. |
| 2002/0060189 A1 | | 5/2002 | Conrad |
| 2002/0079695 A1 | | 6/2002 | Campbell et al. |
| 2004/0070201 A1 | * | 4/2004 | Niermeyer et al. ......... 285/124.1 |

FOREIGN PATENT DOCUMENTS

| | | |
|---|---|---|
| GB | 2 137 110 A | 10/1984 |
| JP | 44-008703 | 4/1969 |
| JP | 54-172372 U | 5/1979 |
| JP | 56-122893 A | 2/1980 |
| JP | 60-028008 U | 2/1985 |
| JP | 62-244409 A | 10/1987 |
| JP | 63-209712 A | 8/1988 |
| JP | 63-503442 A | 12/1988 |
| JP | 03-066691 U | 6/1991 |
| JP | 06-154519 A | 6/1994 |
| JP | 06-178972 A | 6/1994 |
| JP | 10-000314 A | 1/1998 |
| JP | 10-165776 A | 6/1998 |
| JP | 11-216463 A | 8/1999 |
| JP | 2000-325712 A | 11/2000 |
| JP | 2002-361235 A | 12/2002 |
| WO | WO 87/07177 A1 | 12/1987 |
| WO | WO 92/18219 A1 | 10/1992 |
| WO | WO 01/64312 A1 | 9/2001 |

OTHER PUBLICATIONS

PCT/US01/15369 International Preliminary Examination Report, International Search Report, and Written Opinion (11 pages) May 14, 2001.

PCT/US01/15373 International Preliminary Examination Report, International Search Report, and Written Opinion (20 pages) May 14, 2001.

Part 1 of Certified U.S. Appl. No. 08/678,795.
Part 2 of Certified U.S. Appl. No. 08/678,795.
Part 1 of Certified U.S. Appl. No. 09/113,837.
Part 2 of Certified U.S. Appl. No. 09/113,837.
Part 3 of Certified U.S. Appl. No. 09/113,837.

* cited by examiner

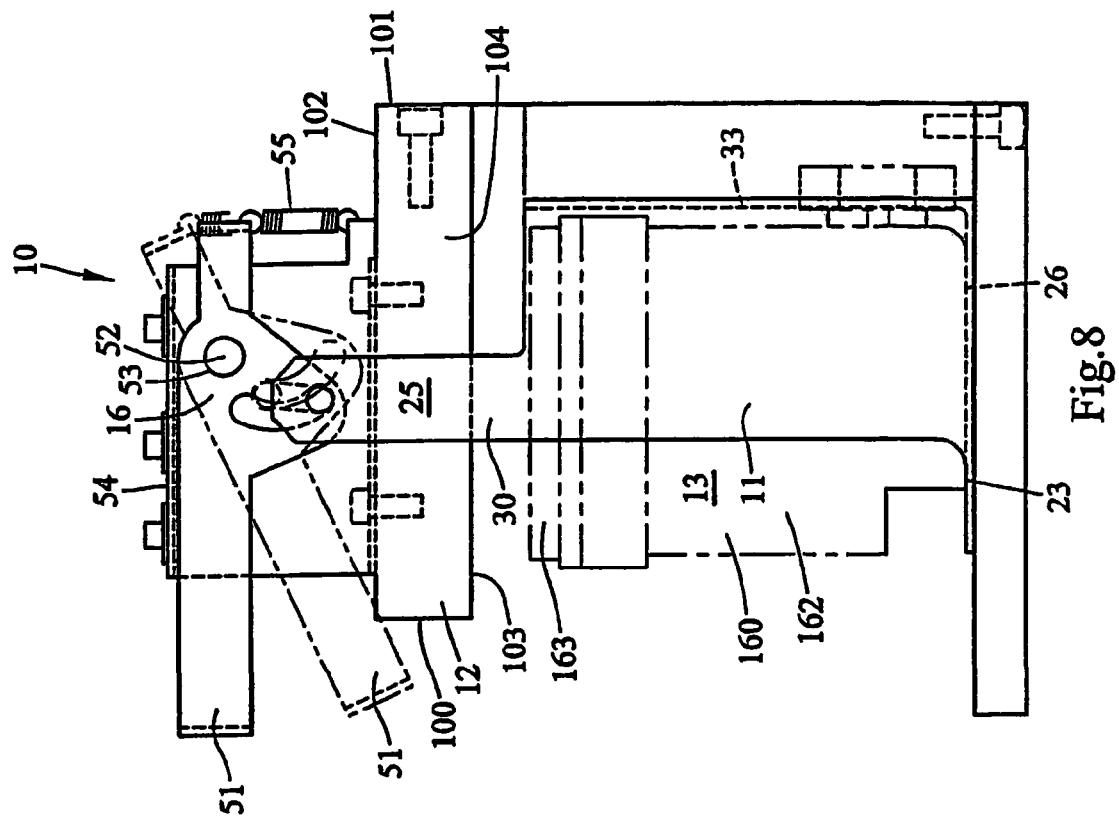
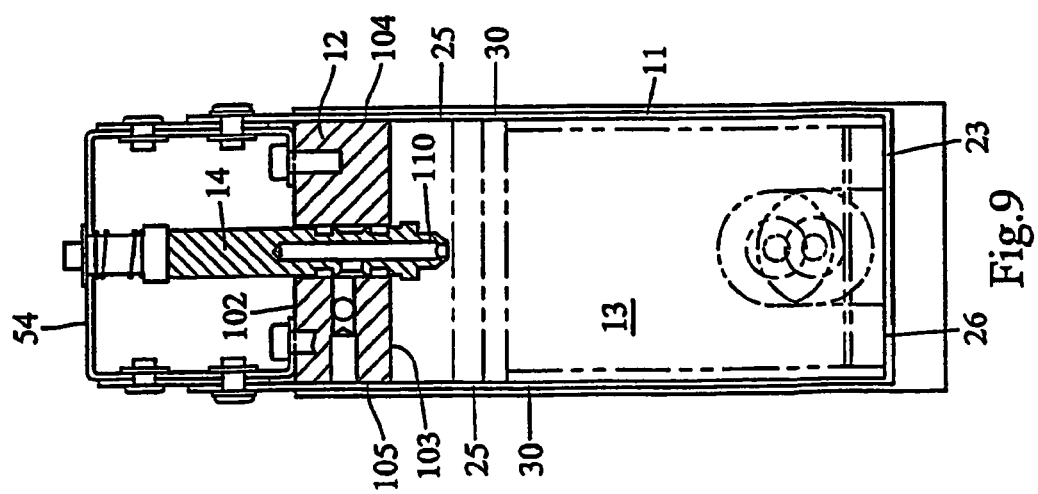

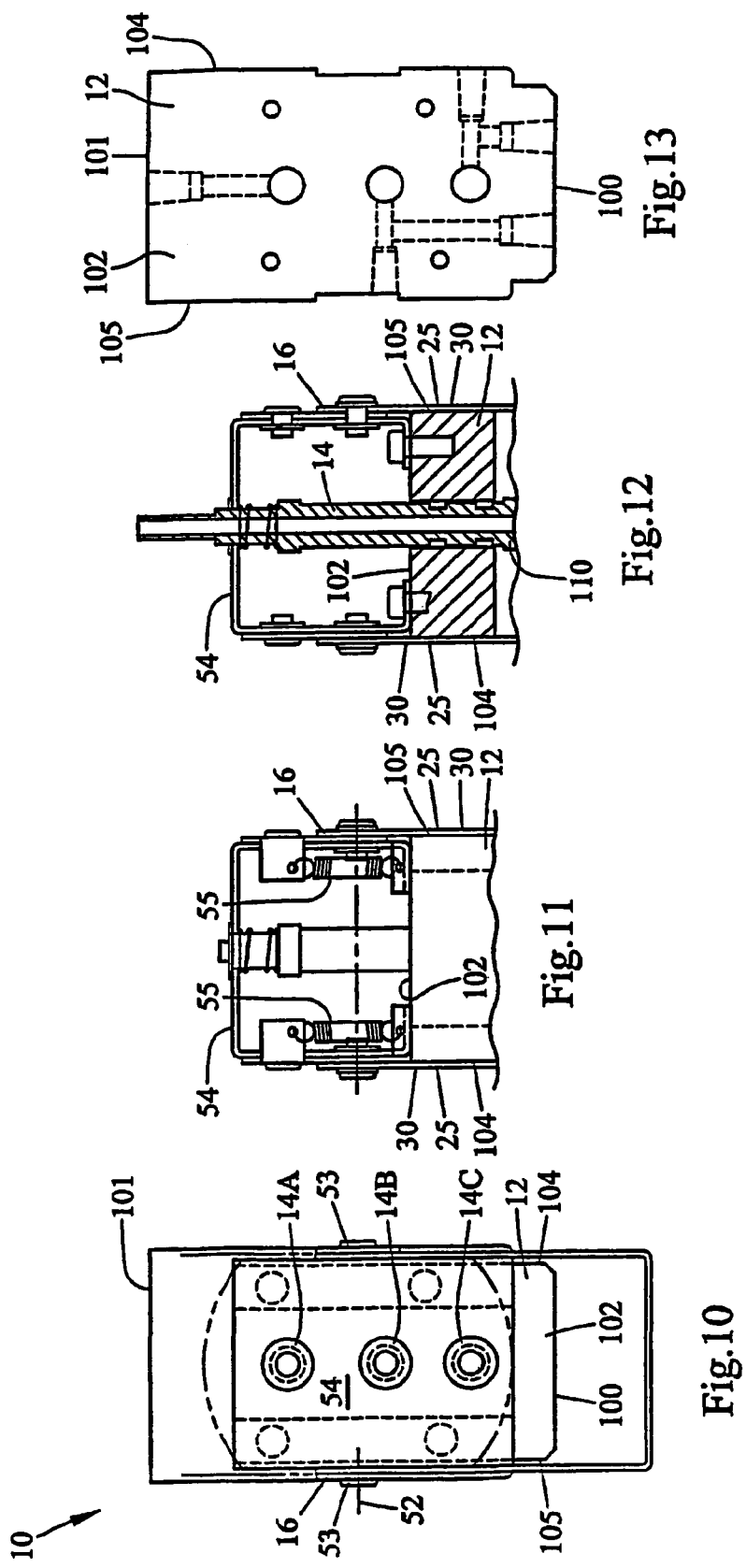

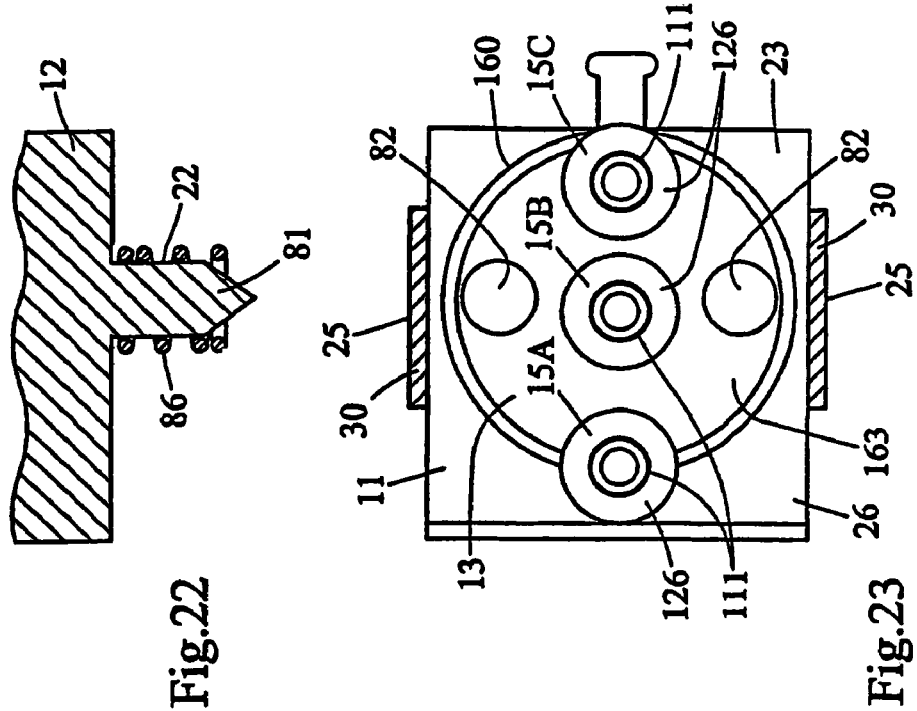
Fig.22
Fig.23
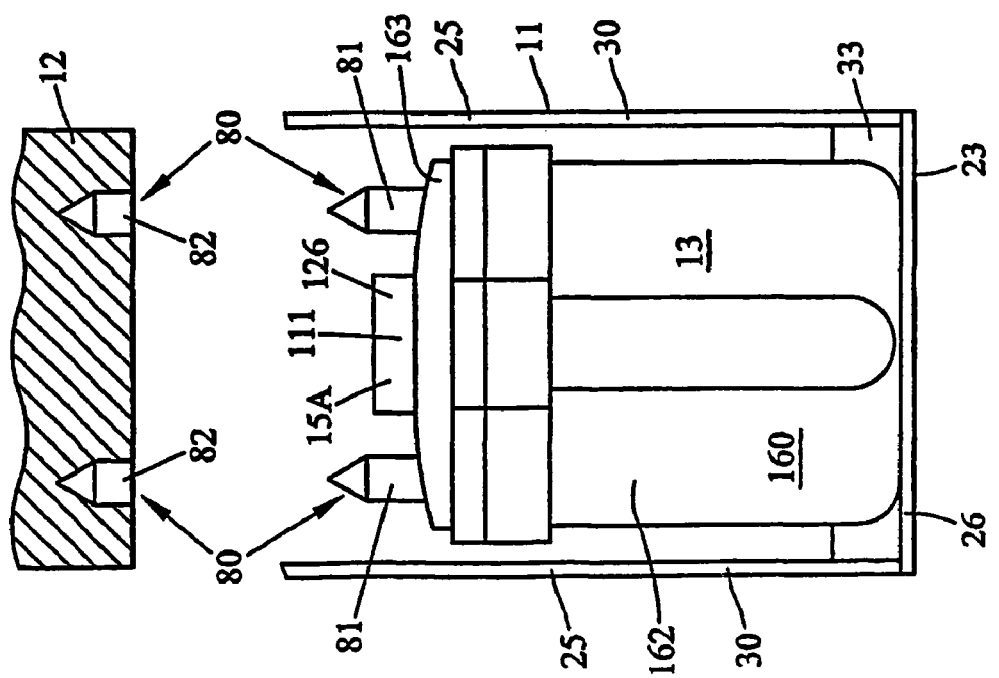
Fig.21

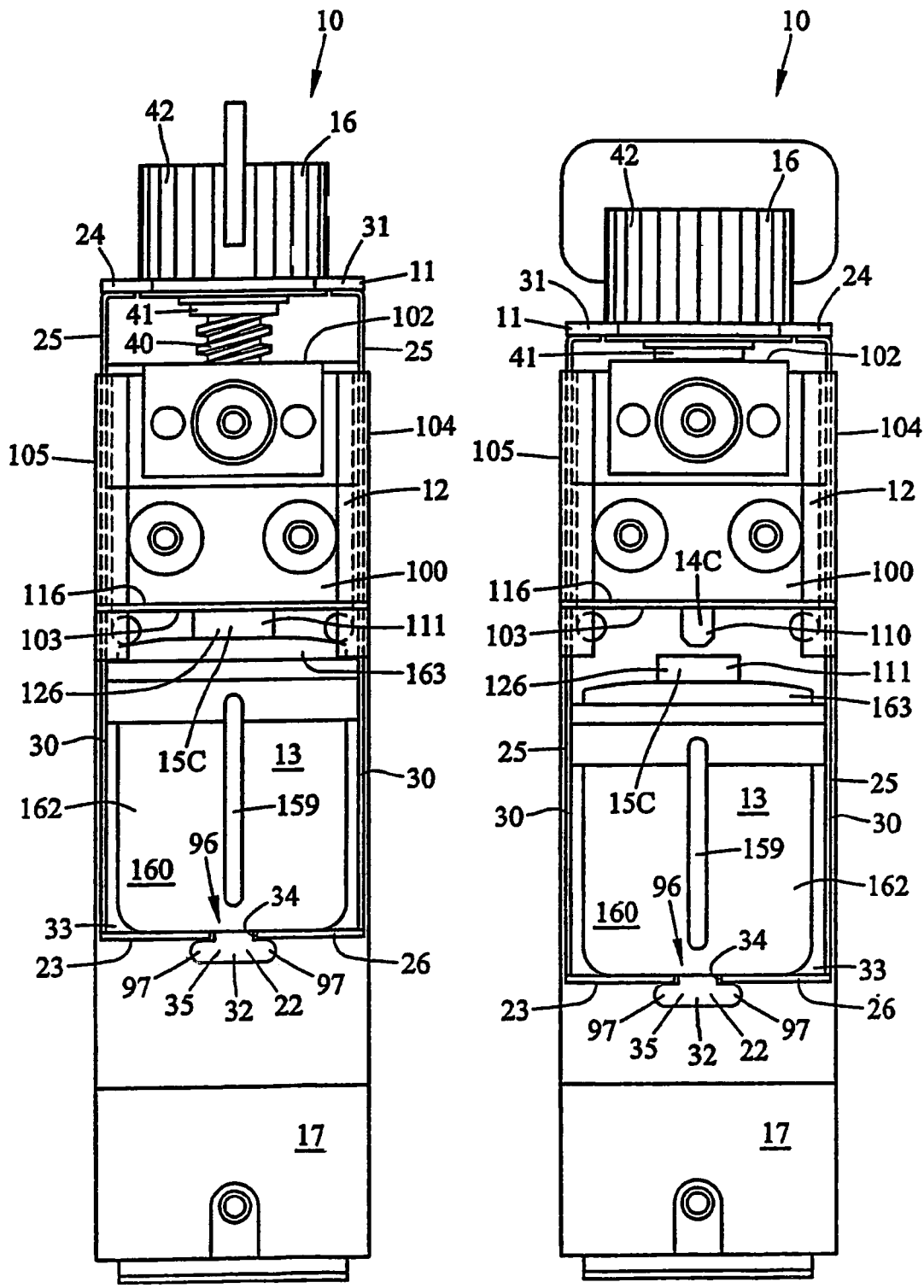

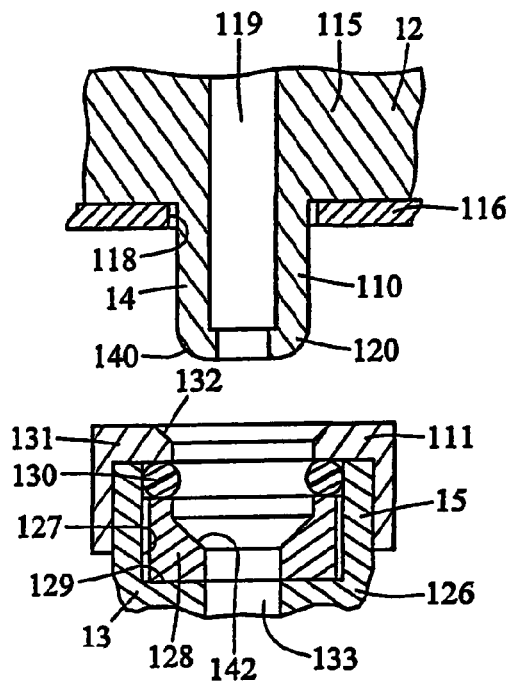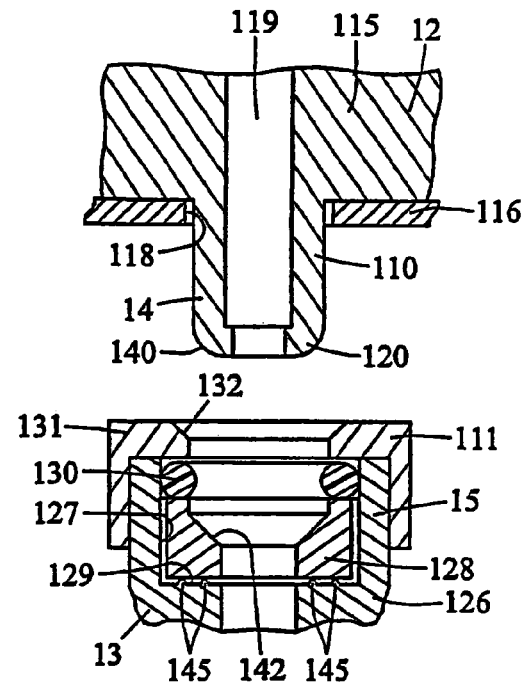
Fig.26    Fig.28
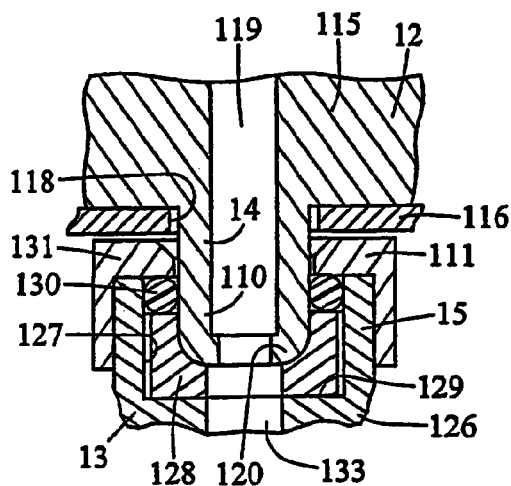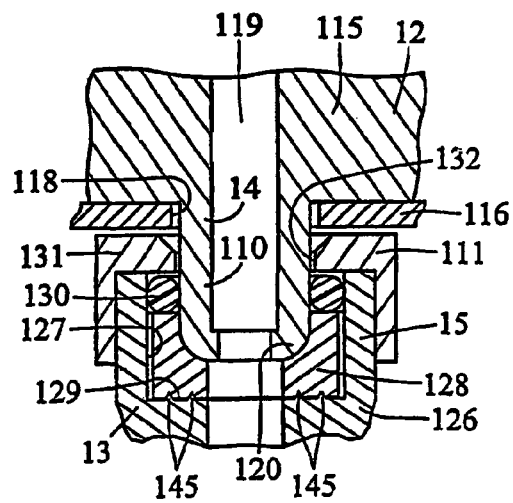
Fig.27    Fig.29

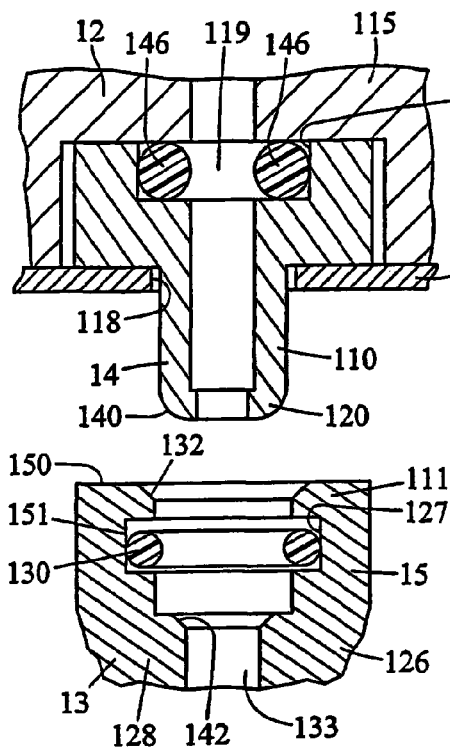
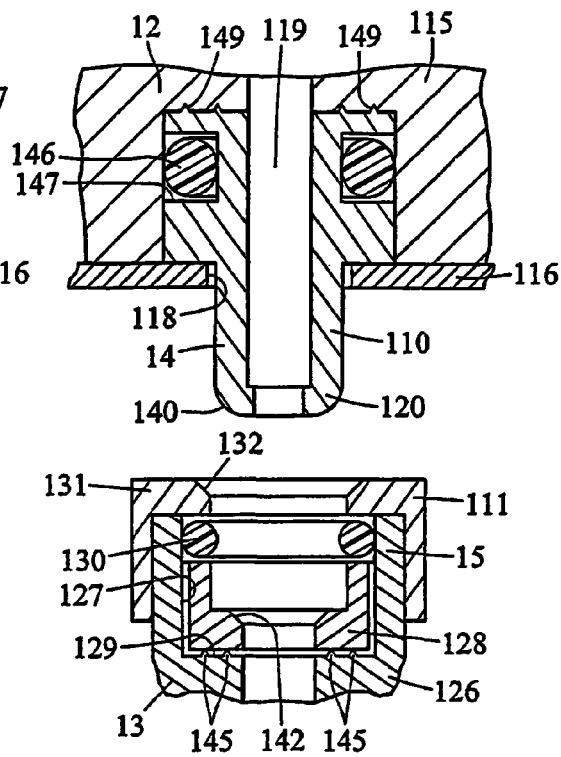
Fig.34
Fig.36
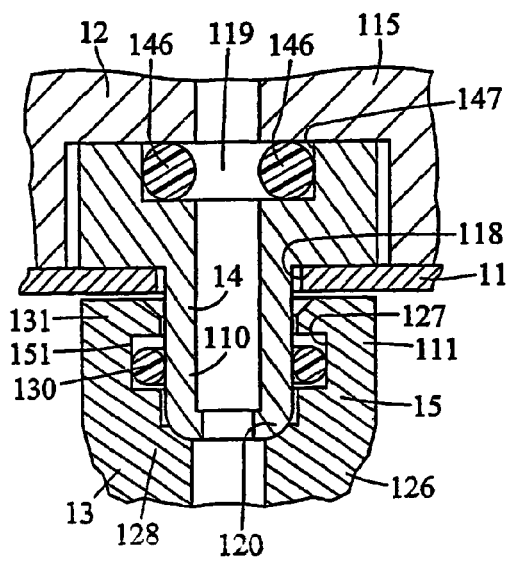
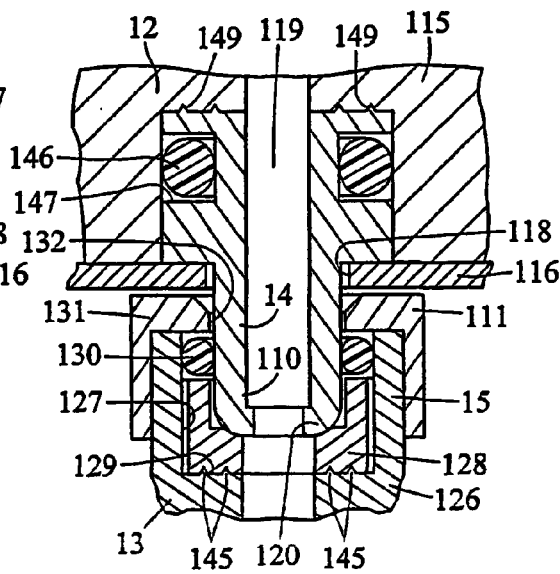
Fig.35
Fig.37

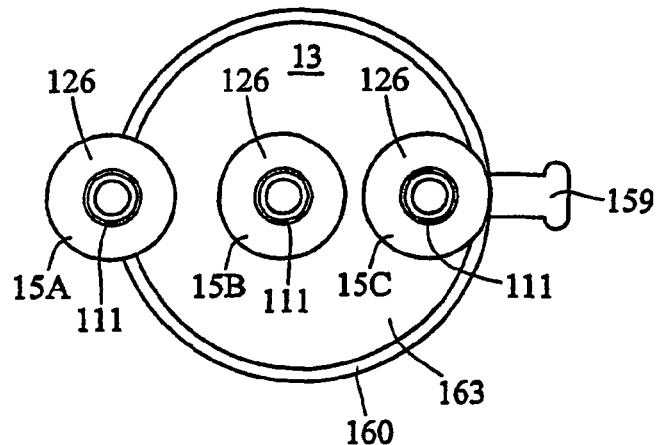
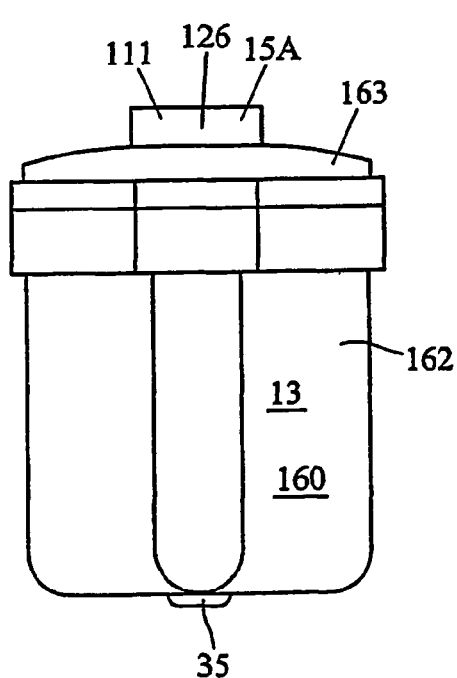
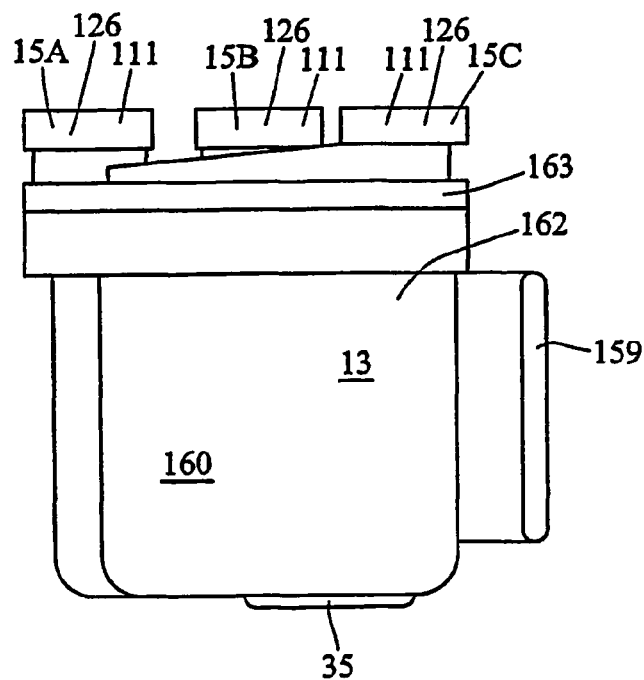
Fig.44
Fig.43
Fig.42

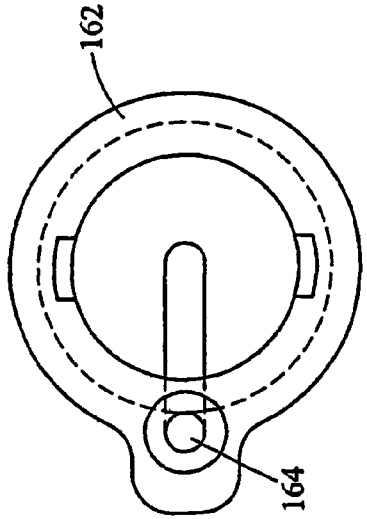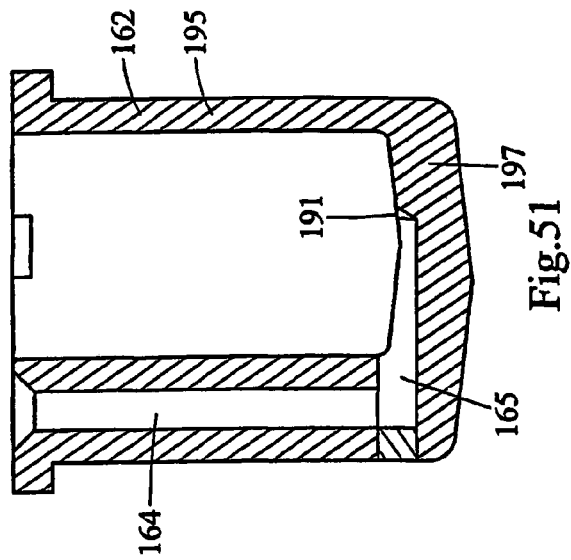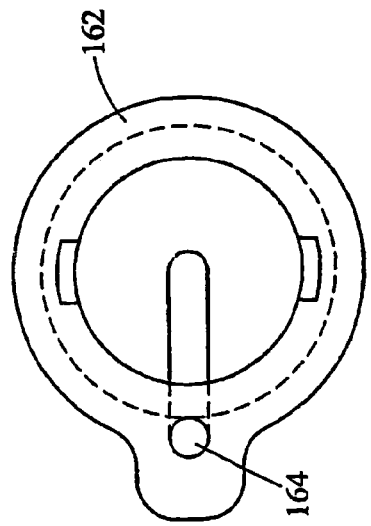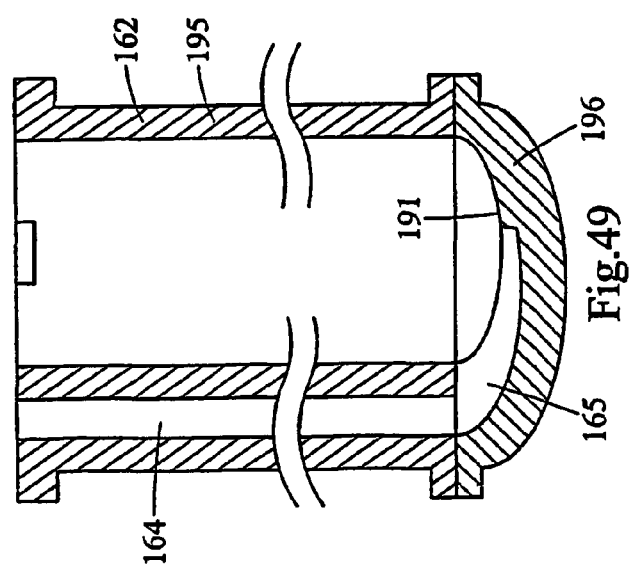

FILTERS

This application is a divisional of U.S. patent application Ser. No. 10/275,860, which was filed on Mar. 6, 2003, which issued on Mar. 27, 2007, as U.S. Pat. No. 7,195,122 B2, and which was the United States national stage of International Application No. PCT/US01/15373, which was filed on May 14, 2001 and claimed priority based on U.S. Provisional Application No. 60/203,948, filed May 12, 2000, and U.S. Provisional Application No. 60/216,697, filed Jul. 7, 2000, all of which are incorporated by reference.

TECHNICAL FIELD

The present invention relates to filters which may be used in a wide variety of applications including, for example, the filtration of a photo-resist liquid.

BACKGROUND OF THE INVENTION

Many fluids, such as photo-resist liquids used in the micro-electronics industry, are exceedingly expensive. These liquids must be filtered immediately prior to being used or impurities in the liquids can damage the micro-electronic components being fabricated.

Conventional filters have many problems associated with them. For example, many conventional filters have relatively large volumes within them, e.g., hold up volumes, which collect and trap the liquid. These hold up volumes are expensive because the expensive liquid trapped in the hold up volumes is discarded when the filter is discarded. Further, many of these filters have dead zones where the flow of fluid stagnates. When a liquid such as a photo-resist liquid stagnates it can undergo chemical and/or physical changes which can be detrimental to the fabrication process. In addition, when the liquid is first pumped through a filter having large hold up volumes and dead zones, the amount of time and the amount of wasted liquid required to fill the hold up volumes and the dead zones before a clean filtered liquid emerges from the outlet of the filter can be considerable.

SUMMARY OF THE INVENTION

The present invention overcomes many problems associated with convention filters, including one or more of the problems previously described.

In accordance with one aspect of the invention, a filter may comprise a housing and a filter cartridge. The housing may include a head, a bowl, an inlet, an outlet, and a vent. The head may be permanently attached to the bowl, and the bowl may include a side wall having an interior and a bottom wall having an interior. The housing further may include a filter cartridge chamber. The filter cartridge may be permanently positioned in the filter cartridge chamber of the housing. The filter cartridge may have an exterior and a bottom and may include a hollow filter element and a blind end cap. The filter element may have a hollow interior, and the blind end cap may be sealed to a lower end of the filter element. The inlet may fluidly communicate with one of the exterior and the interior of the filter cartridge. The outlet may fluidly communicate with the other of the exterior and the interior of the filter cartridge. The vent may vent gas from the housing. The interior of the side wall of the bowl may fit around the exterior of the filter cartridge, defining an annular channel between the interior of the side wall and the exterior of the filter cartridge. The bottom of the filter cartridge may include a surface which is inclined upwardly toward the annular channel. The interior of the bottom wall of the bowl may include a surface which faces the bottom surface of the filter cartridge and is inclined upwardly toward the annular channel.

DESCRIPTION OF THE DRAWINGS

FIG. 8 is a side view of an alternative filtration system.

FIG. 9 is a partially sectioned front view of the filtration system of FIG. 8.

FIG. 10 is a top view of the filtration system of FIG. 8.

FIG. 11 is a rear view of an upper portion of the filtration system of FIG. 8.

FIG. 12 is a partially cutaway rear view of an upper portion of the filtration system of FIG. 8.

FIG. 13 is a top view of the manifold of the filtration system of FIG. 8.

FIG. 21 is a partially cutaway side view of a centering mechanism.

FIG. 22 is a sectional side view of an alternative centering mechanism.

FIG. 23 is a partially cutaway top view of a portion of the centering mechanism of FIG. 22.

FIG. 24 is a front view of a filtration system having an alternative disengagement mechanism showing a manifold and a capsule filter disengaged.

FIG. 25 is a front view of the filtration system of FIG. 24 showing the manifold and the capsule filter engaged.

FIG. 26 is a sectional view of a nozzle/receptacle arrangement showing the nozzle and the receptacle disengaged.

FIG. 27 is a sectional view of the nozzle/receptacle arrangement of FIG. 26 showing the nozzle and receptacle engaged.

FIG. 28 is a sectional view of an alternative nozzle/receptacle arrangement showing the nozzle and the receptacle disengaged.

FIG. 29 is a sectional view of the nozzle/receptacle arrangement of FIG. 28 showing the nozzle and the receptacle engaged.

FIG. 34 is a sectional view of a nozzle/receptacle arrangement showing the nozzle and the receptacle disengage.

FIG. 35 is a sectional view of the nozzle/receptacle arrangement of FIG. 34 showing the nozzle and the receptacle engaged.

FIG. 36 is a sectional view of a nozzle/receptacle arrangement showing the nozzle and the receptacle disengaged.

FIG. 37 is a sectional view of the nozzle/receptacle arrangement of FIG. 36 showing the nozzle and the receptacle engaged.

FIG. 42 is a side view of the capsule filter.

FIG. 43 is a rear view of the capsule filter of FIG. 42.

FIG. 44 is a top view of the capsule filter of FIG. 42.

FIG. 49 is a sectional side view of an alternative bowl of a capsule filter.

FIG. 50 is a top view of the bowl of FIG. 49.

FIG. 51 is a sectional side view of an alternative bowl.

FIG. 52 is a top view of the bowl of FIG. 51.

DESCRIPTION OF EMBODIMENTS

Figure 1:
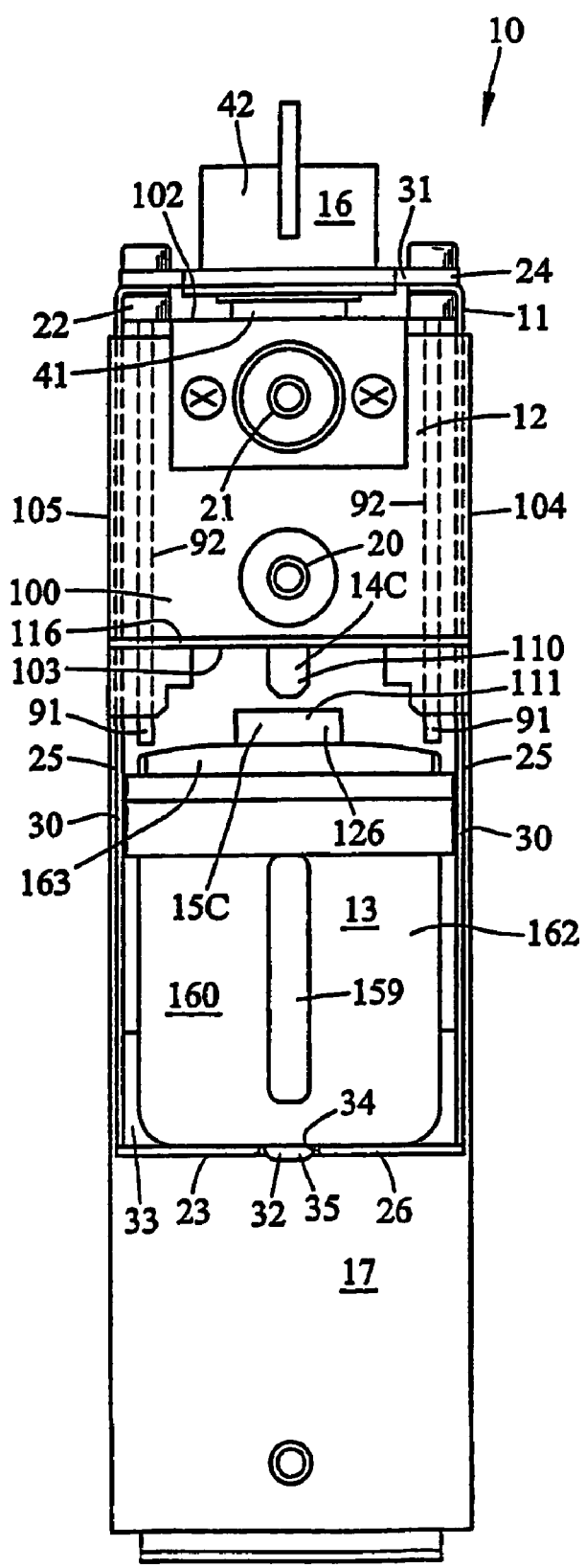
FIG. 1 is a front view of a filtration system showing a manifold and a capsule filter disengaged.
Figure 2:
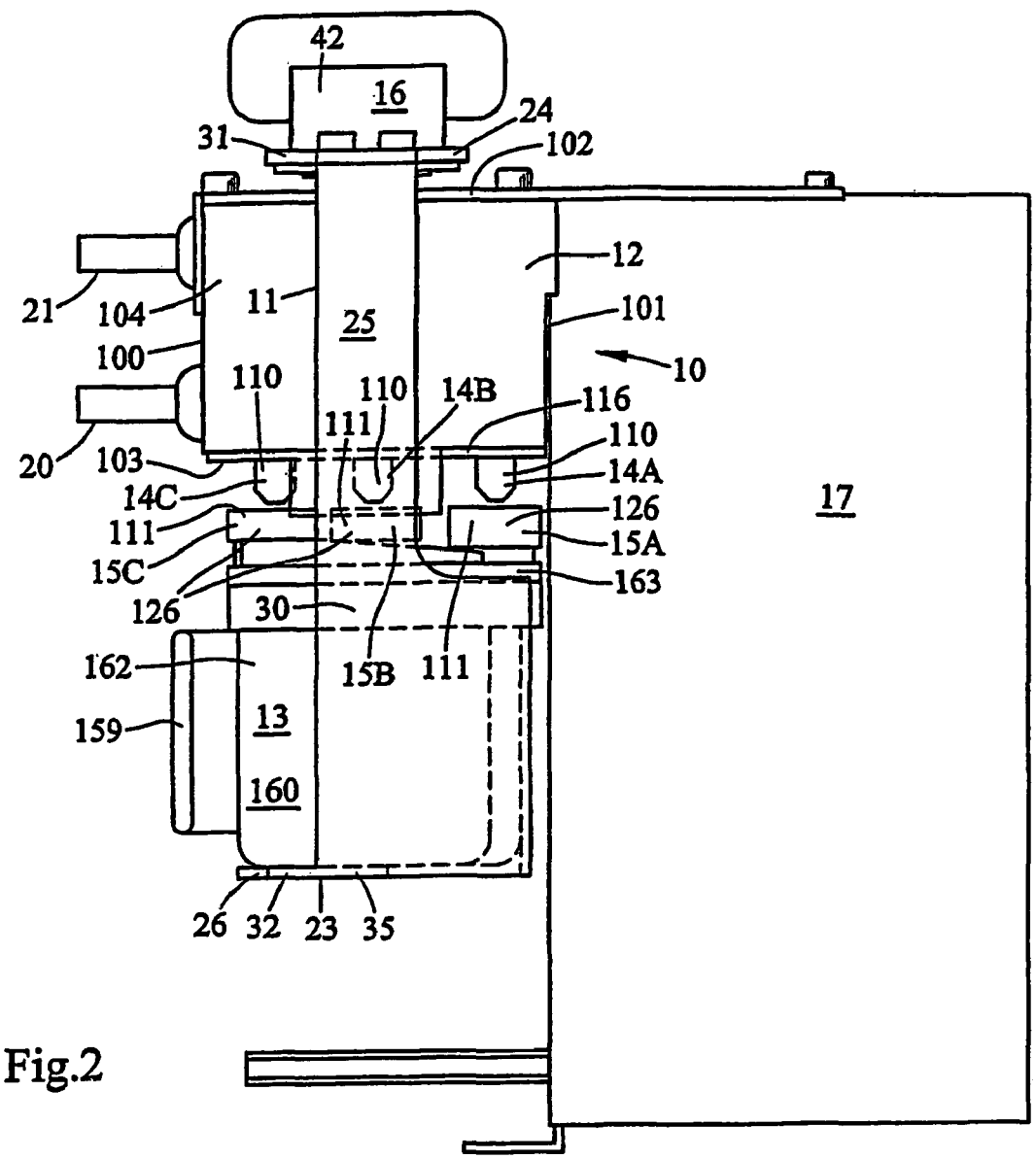
FIG. 2 is a side view of the filtration system of FIG. 1.
Figure 3:
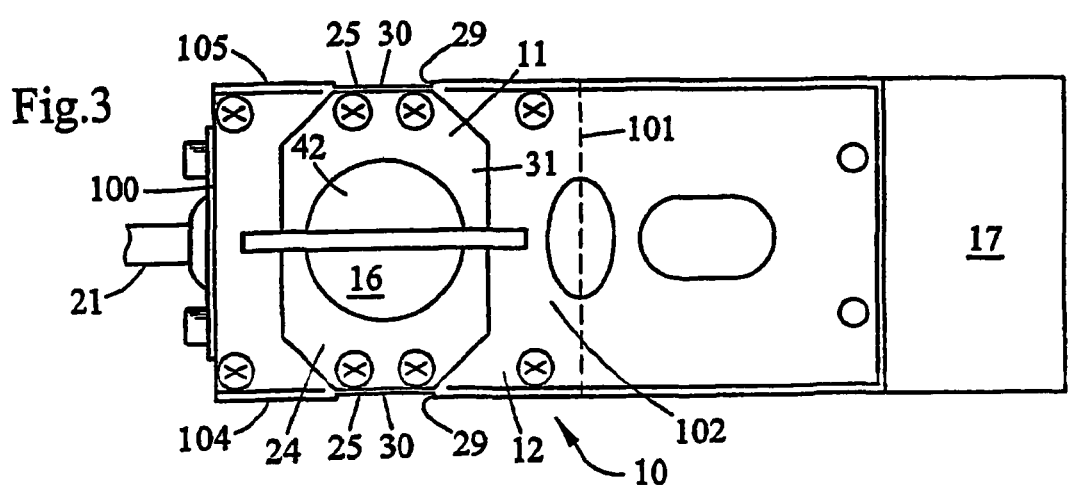
FIG. 3 is a top view of the filtration system of FIG. 1.
Figure 4:
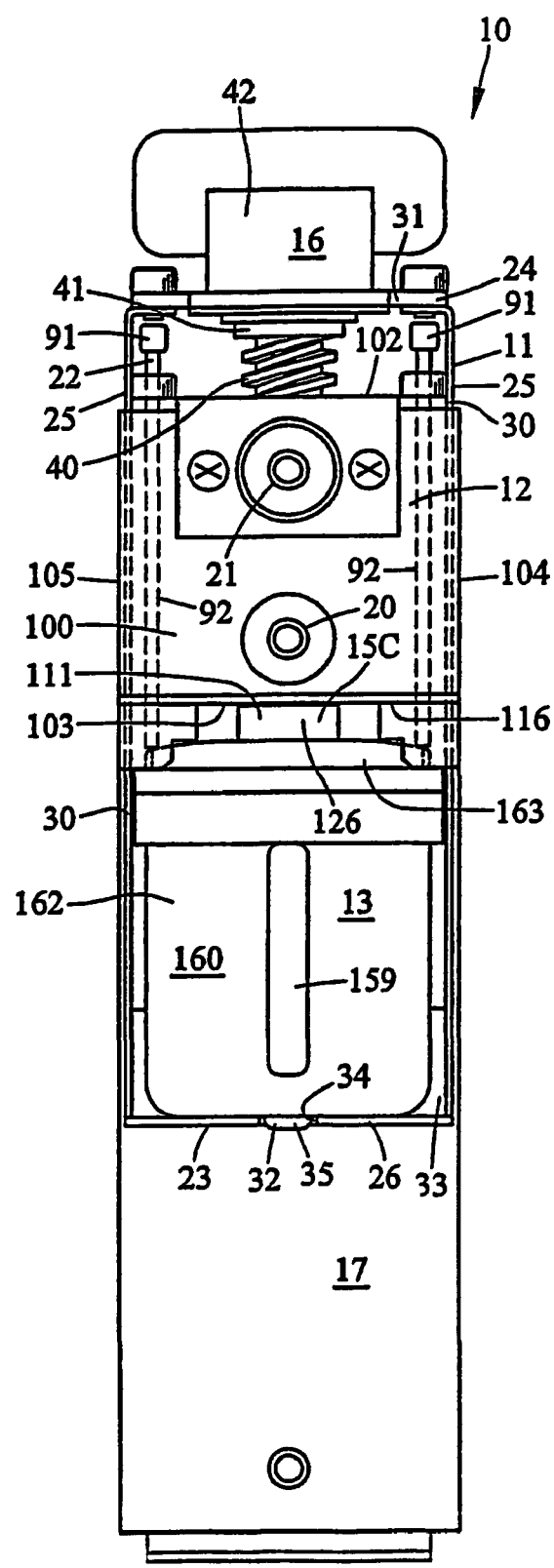
FIG. 4 is a front view of the filtration system of FIG. 1 showing the manifold and the capsule filter engaged.

One example of a filtration system 10 is shown in FIGS. 1-4. The filtration system 10 generally comprises a loading/unloading equipment, e.g., a carriage 11, and further comprises a manifold 12 and a filter, such as a capsule filter 13, embodying the invention. The capsule filter includes a filter medium, and the manifold 12 and the capsule filter 13 may include mating fittings 14, 15, e.g., inlet fittings 14a, 15a, outlet fittings 14b, 15b, and vent fittings 14c, 15c. The carriage 11 supports the capsule filter 13 and is cooperatively arranged with the manifold 12 to mount the capsule filter 13 to the manifold 12 and engage the fittings 15 of the capsule filter 13 with the respective fittings 14 of the manifold 12. For example, a mounting mechanism 16 may be arranged between the carriage 11 and the manifold 12 to move the capsule filter 13, e.g., longitudinally, between a disengaged position, as shown in FIGS. 1 and 2, and an engaged position, as shown in FIG. 4. In the disengaged position, the capsule filter 13 may rest in the carriage 11 and may be spaced from the manifold 12. In the engaged position, the capsule filter 13 engages the manifold 12, and the fittings 14, 15 of the manifold 12 and the capsule filter 13 are sealed to one another.

With the fittings 14, 15 engaged, a pump 17, which may be fluidly coupled and even directly attached to the manifold 12, pumps fluid, e.g., a liquid such as a liquid photo resist, into an inlet conduit in the manifold 12, through the inlet fittings 14a, 15a, and into the capsule filter 13. Gases, such as air contained in the capsule filter 13 or gas bubbles entrained in the liquid, may be vented from the capsule filter 13 via the vent fittings 14c, 15c, and a vent conduit 20 of the manifold 12. Filtered liquid is forced by the pump through the filter medium of the capsule filter 13 and out of the capsule filter 13 via the outlet fittings 14b, 15b, and an outlet conduit 21 of the manifold 12.

Once the filter medium of the capsule filter 13 becomes sufficiently fouled, the pump 17 may be deactivated and the carriage 11 may be moved, e.g., lowered, by the mounting mechanism 16 to the disengaged position. A disengagement mechanism 22 may be coupled between the capsule filter 13 and the carriage 11 and/or the manifold 12 to disengage the fittings 15 of the filter capsule 13 from the fittings 14 of the manifold 12 as the carriage 11 is lowered. Alternatively, the capsule filter 13 may be disengaged from the manifold 12 manually. The old capsule filter 13 may then be replaced with a new capsule filter 13; the carriage 11 may be moved, e.g., raised, by the mounting mechanism 16 to the engaged position engaging the new capsule 13 with the manifold 12; and the pump 17 may then be reactivated.

The carriage 11 may be configured in a wide variety of ways. In may preferred embodiments, the carriage 11 may be arranged to move the capsule filter 13, both into and out of engagement with the manifold 12, in a direction parallel to the axes of the engaged fittings 14, 15. More preferably the carriage 11 moves the capsule filter 13 in a direction parallel to the axes of the engaged fittings 14, 15 along most of, even more preferably, substantially all of, the distance that the capsule filter 13 travels on the carriage 11. This reduces stress on the fittings 14, 15 and enhances the amount of contact and the seal between the fittings.

In one example, shown in FIGS. 1 and 2, the carriage 11 may include a base assembly 23, a top assembly 24, and first and second preferably identical side assemblies 25 which extend between the top assembly 24 and the base assembly 23. The base, top, and side assemblies may each comprise any of a wide array of suitable structures, including multi-piece structures. However, in many preferred embodiments, the base assembly 23 comprises a base 26, such as a base plate, which supports the capsule filter 13 and on which the capsule filter 13 rests. Further, the side assemblies 25 each comprise side plates 30 which are connected to the base 26. The side plates 30 preferably extend parallel to each other closely along the exterior of the sides of the manifold 12 to the top assembly 24. The manifold 12 may include guide channels 29 within which the side plates 30 slide, e.g., upwardly and downwardly, as the carriage 11 moves between the disengaged and engaged positions. Alternatively, the manifold may include pins or rollers which engage slots or tracks on the side plates. In addition, the top assembly 24 comprises a top plate 31 which is connected to the side plates 30 and extends along the top of the manifold 12. The carriage 11 thus surrounds the exterior of the manifold 12 and is preferably accessible for maintenance without having to disturb the manifold 12, e.g., dismantle the manifold 12 from the pump 17.

As another example, the carriage may comprise a base assembly and opposite side assemblies without a top assembly. The carriage may then be operatively associated with the manifold in any suitable manner, for example, by connecting the side assemblies of the carriage to the sides or the bottom of the manifold via a mounting mechanism. As yet another example, the carriage may be operatively associated with a structure other than the manifold. For example, when the manifold is attached to a pump, the carriage may also be coupled to the pump, rather than the manifold, and arranged to move the capsule filter between engagement and disengagement with the manifold.

In many preferred embodiments, the base plate and the side plates comprise a generally U-shaped assembly adapted to support the capsule filter, and the carriage thus comprises a compact, highly space efficient structure for supporting the capsule filter. For example, the carriage and the capsule filter may be installed in a space having a relatively small width, e.g., a width of about 60 millimeters or less, compared to a width of about 140 millimeters or more required for many conventional filter mounting mechanisms. The capsule filter 13 can thus be mounted and dismounted within a 60-millimeter-wide front area. Especially when combined with a 60 millimeter-wide pump, the filtration system provides a dispensing system that has a high space utilization efficiency but is nonetheless easily accessible and therefore easy to use and maintain.

In the disengaged position, the carriage preferably supports the filter capsule on the base assembly. The filtration system may also include a positioning mechanism which allows the capsule filter to be positioned and oriented on the base assembly with the fittings of the capsule filter at least roughly aligned with the fittings of the manifold. The positioning mechanism may be operatively associated with the carriage and/or the capsule filter and may take a variety of forms. In the embodiment of FIGS. 1-4, the positioning mechanism 32 is cooperatively arranged with the base 26 and may include a rear wall 33 which limits the rearward movement of the capsule filter 13. The rear wall may extend from the base assembly or from one or both of the side assemblies. Further, the positioning mechanism 32 may include an opening such as an elongated slot 34 which extends within the base 26 from the front edge and a corresponding elongated tab or protrusion 35 which extends from the bottom of the capsule filter 13. The slot 34 and the protrusion 35 may be dimensioned to limit the rearward movement of the capsule filter 13 on the base 26 and/or to angularly orient the capsule filter 13 on the base 26 with the fittings 15, 14 at least roughly aligned with one another. With the capsule filter 13 positioned on the base 26, the capsule filter 13 may slide rearwardly along the base 26 with the protrusion 35 sliding within the slot 34. The close proximity of the sides of the slot 34 and the sides of the protrusion 35 maintain the capsule filter 13 at a desired angular orientation with respect to the manifold 12. Once the backside of the capsule filter 13 contacts the rear wall 33 and/or the backside of the protrusion 35 contacts the backside of the slot 34, the axes of the fittings 14, 15 are at least roughly aligned axially. The capsule filter 13 may then be mounted to the manifold 12 without damaging the fittings 14, 15 due to misalignment.

Figure 7:
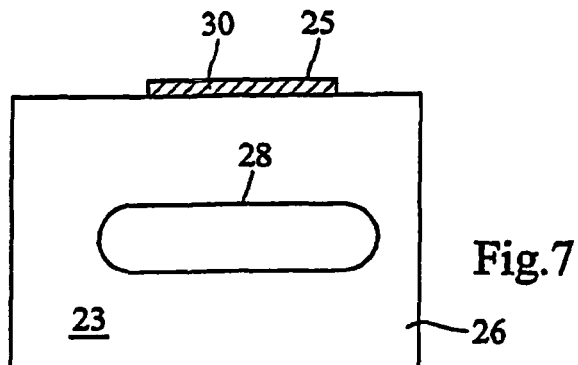
FIG. 7 is a partially sectioned top view of an alternative base assembly of the filtration system of FIG. 1.
Figure 6:
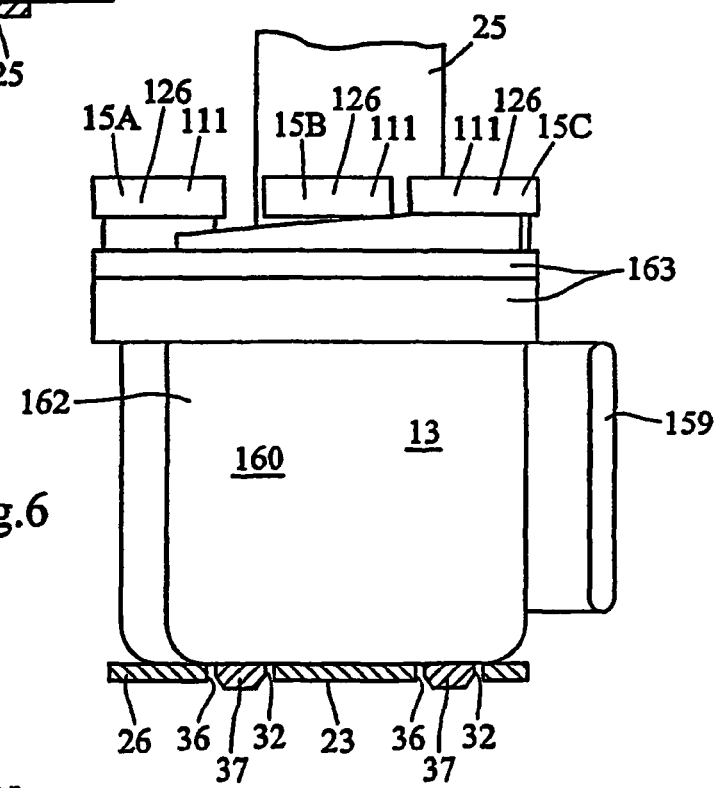
FIG. 6 is a partially sectioned side view of the base assembly of FIG. 5 and a capsule filter mounted on the base assembly.
Figure 5:
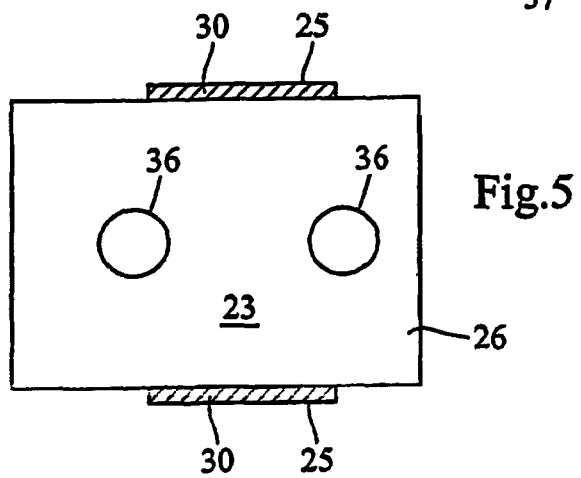
FIG. 5 is a partially sectioned top view of an alternative base assembly of the filtration system of FIG. 1.
Figure 15:
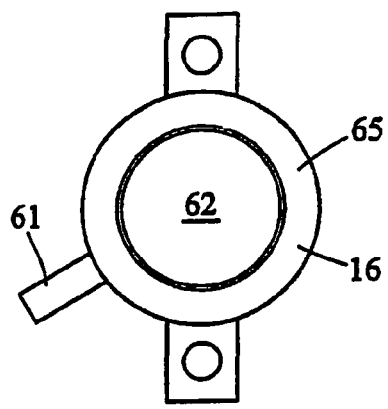
FIG. 15 is a top view of the mounting mechanism of FIG. 14.

The positioning mechanism is not limited to the embodiment shown in FIGS. 1-4. For example, as shown in FIGS. 5 and 6, the rear wall may be eliminated and the positioning mechanism may comprise openings such as one or more holes 36 in the base 26 and one or more corresponding protrusions 37 extending from the bottom of the capsule filter 13. The capsule filter 13 is positioned on the base 26 with the protrusions 37 of the capsule filter 13 disposed in the holes 36 of the base 26. The protrusions 37 and the holes 36 are dimensioned and located on the capsule filter 13 and the base 26, respectively, such that when the protrusions 37 are disposed in the holes 36, the fittings 14, 15 of the manifold 12 and the capsule filter 13 are at least roughly aligned axially. The embodiment shown in FIGS. 5 and 6 has two holes 36 and two protrusions 37. However, the positioning mechanism may comprise more than two holes and protrusions, e.g., three holes and protrusions spaced from one another in a triangular configuration, or only one hole and protrusion, e.g., an elongated hole 28 (and a corresponding protrusion) as shown in FIG. 7. Further, while the positioning mechanisms of the illustrated embodiments have been associated with the base assembly, the positioning mechanism may be associated with the carriage in other ways, e.g., with the side assemblies.

Once the capsule filter 13 is positioned on the carriage 11, the carriage 11 is moved from the disengaged position toward the engaged position by the mounting mechanism. The mounting mechanism may also take a variety of forms, and one example of a mounting mechanism 16 is shown in FIGS. 1-4. The mounting mechanism 16 is preferably cooperatively arranged between the carriage 11 and the manifold 12 and in some embodiments may comprise a threaded arrangement including a threaded stud 40 and a mating nut 41, which may be part of a knob 42. The threaded stud 40 may have trapezoidal threads and is preferably fixedly mounted to the top of the manifold 12 extending toward the top assembly 24 of the carriage 11. The nut 41 is correspondingly threaded and is preferably rotatably mounted to the top assembly 24, e.g., the top plate 31, to receive the stud 41 in threaded engagement. As the knob 42 is rotated in one direction, the nut 41 moves axially in one direction along the stud 40, e.g., away from the manifold 12, and, in turn, moves the base 26 of the carriage 11 from the disengaged position toward the manifold 12 and the engaged position, where the fittings 15 of the capsule filter 13 engage the fittings 14 of the manifold 12. As the knob 42 is turned in the opposite direction, the nut 41 moves axially in the opposite direction along the stud 40 (e.g., toward the manifold 12) and, in turn, moves the base 26 of the carriage 11 back toward the disengaged position. The threads may be arranged to provide a quick release of the capsule filter 13 from the manifold 12. For example, the threads may be arranged such that turning the knob 42 in the range from about 90 degrees to about 360 degrees may be enough to release the capsule filter 13 from the manifold 12.

Alternatively, the mounting mechanism may comprise a threaded stud and a correspondingly threaded portion of the top assembly of the carriage, which receives the threaded stud. One end of the threaded stud may be part of a knob and the opposite end of the stud may bear against, or may be rotatably fixed to, the top of the manifold. This embodiment of the mounting mechanism operates in a manner similar to the mounting mechanism 16 shown in FIGS. 1-4.

Another example of a mounting mechanism 16 is shown in FIGS. 8-13. (Components of the embodiment shown in FIGS. 8-13 have the same reference numbers as the analogous components of the embodiments shown in FIGS. 1-7.) The mounting mechanism 16 shown in FIGS. 8-13 is preferably cooperatively arranged between the carriage 11 and the manifold 12 and may comprise a pivotable lever arrangement including a lever 51 which is pivotable about a pivot axis 52. The lever may be coupled between the manifold and the carriage in a variety of ways. For example, the lever 51 may be pivotably mounted by pivot pins 53 to a bracket 54 which, in turn, is mounted to the top of the manifold 12. Alternatively, the lever 51 may be mounted to brackets on the sides of the manifold. The lever 51 may also be mounted to the carriage 11 in a variety of ways, e.g., to the side assemblies 25. The lever 51 is preferably arranged to lift the carriage 11 from the disengaged position toward the engaged position as the lever 51 is lifted and to lower the carriage 11 from the engaged position toward the disengaged position as the lever 51 is lowered. The mounting mechanism 16 may also include a spring arrangement 55 for biasing the lever 51 toward a lifted and/or lowered position, maintaining the carriage 11 in the engaged and/or disengaged position.

Other examples of mounting mechanisms, e.g., mounting mechanisms comprising a cam arrangement, are shown in FIGS. 14-20. (Again, components of the embodiments shown in FIGS. 14-20 have the same reference numbers as the analogous components of the embodiments shown in FIGS. 1-13.) For example, the mounting mechanism 16 shown in FIGS. 14 and 15 may comprise a removable or fixed lever 61 connected to a rotatable shaft 62 which, in turn, is rotatably connected to the manifold 12 by a mounting plate 63. The lever 61 extends through a cam slot 64 in a head 65 which may be fixedly attached to the top assembly 24 of the carriage 11, e.g., at the top plate 31. As the lever 61 is moved along the cam slot 64, the head 65 and hence the carriage 11 is raised or lowered between the disengaged position and the engaged position.

Figure 17:
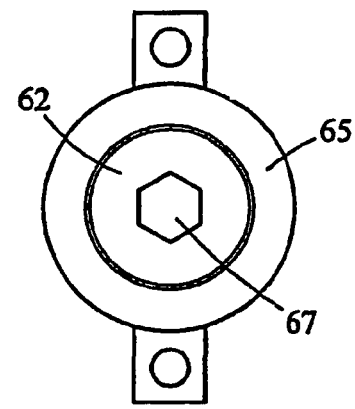
FIG. 17 is a top view of the mounting mechanism of the FIG. 16.
Figure 14:
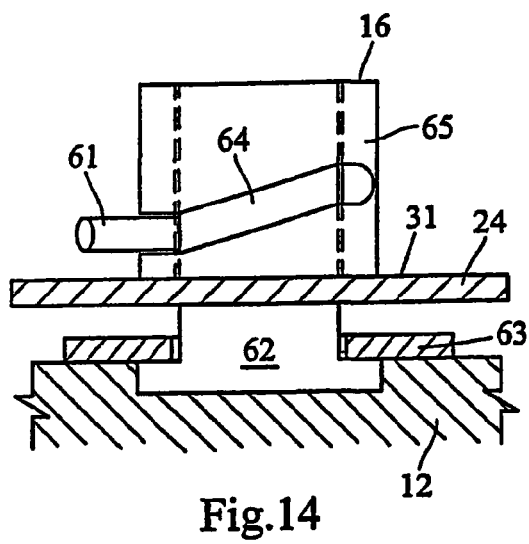
FIG. 14 is a partially cutaway side view of an alternative mounting mechanism.
Figure 16:
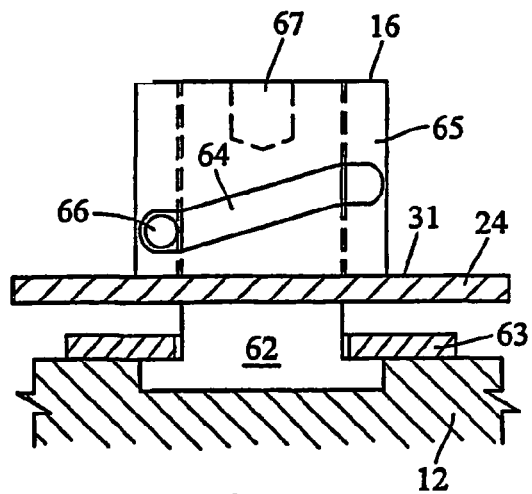
FIG. 16 is a partially cutaway side view of an alternative mounting mechanism.

A similar mounting mechanism 16 is shown in FIGS. 16 and 17. The mounting mechanism 16 may include a pin 66 which extends radially from the rotatable shaft 62. The pin 66 is disposed in the cam slot 64 of the fixed head 65. The cam slot 64 may extend completely through the head 65, as in the embodiment shown in FIG. 14, or it may merely extend partially into the inner periphery of the head 65. A structure 67 formed at the end of the shaft 62 may be engaged by a wrench, e.g., an allen wrench, to turn the shaft 62. Alternatively, the shaft may extend axially beyond the head and the protruding end of the shaft may be formed as a knob which may be turned manually. As the shaft 62 is turned, the pin 66 rides along the cam slot 64, and the head 65 and hence the carriage 11 is raised or lowered between the disengaged position and the engaged position.

Figure 20:
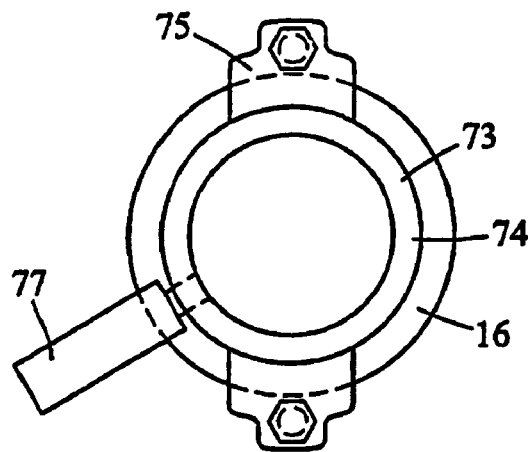
FIG. 20 is a top view of the mounting mechanism of FIG. 18.
Figure 19:
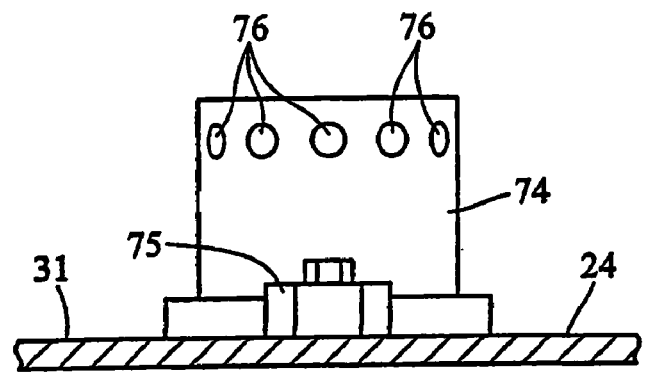
FIG. 19 is a side view of the rotatable head of the mounting mechanism of FIG. 18.
Figure 18:
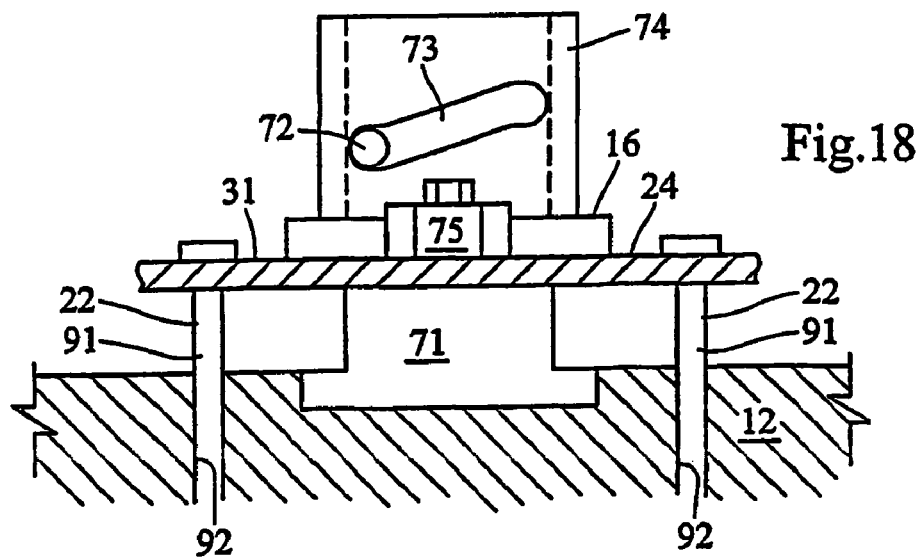
FIG. 18 is a partially cutaway side view of an alternative mounting mechanism.

Another example of a mounting mechanism 16 which comprises a cam arrangement is shown in FIGS. 18-20. The mounting mechanism 16 may include a nonrotatable shaft 71 fixed to the manifold 12 and having a radially extending pin 72. The pin 72 is disposed in a cam slot 73 of a head 74 which is rotatably attached to the top assembly 24 of the carriage 11 by a mounting plate 75. Holes 76 in the head 75 receive a removable lever 77, e.g., a screwdriver, which can be used to rotate the head 74 on the shaft 71. Alternatively, the lever may be fixed to the head; the head may be formed with a structure that can be turned with a wrench; or the head may be formed as a knob that can be turned manually. As the head 75 is rotated, the pin 72 rides along the cam slot 73, and the head 74 and hence the carriage 11 is raised or lowered between the disengaged position and the engaged position.

As the carriage 11 is moved toward the manifold 12 from the disengaged position to the engaged position, the fittings 15 of the capsule filter 13 approach the fittings 14 of the manifold 12. The fittings 14, 15 may be at least roughly aligned by the positioning mechanism. However, to more closely align the fittings 14, 15, the filtration system 10 may include a centering mechanism which closely aligns the axes of the fittings 14, 15 as they engage one another. The centering mechanism may be configured in a wide variety of ways. For example, the centering mechanism 80 may comprise one or, preferably, a plurality of centering protrusions, e.g., centering pins 81, which fit into corresponding centering apertures 82 as the fittings 14, 15 engage each other. As shown in FIG. 21, the centering pins 81 may extend upwardly from the capsule filter 13, e.g., the top of the capsule filter 13, and the corresponding centering apertures 82 may be disposed in the manifold 12, e.g., the bottom of the manifold 12. Alternatively, as shown in FIGS. 22 and 23, the centering pins 81 may extend from the bottom of the manifold 12 and the centering apertures 82 may be disposed in the top of the capsule filter 13.

The centering mechanism 80 is preferably located and dimensioned to ensure that the fittings 14, 15 are closely axially aligned as they sealingly contact one another. For example, the centering pins 81 and apertures 82 may have relatively close tolerances and may be arranged to closely engage one another before the fittings 14, 15 fully contact and are completely sealed to one another. With the centering pins 81 closely engaged with the centering apertures 82, the fittings 14 of the manifold 12 may be moved into full sealing contact with the fittings 15 of the capsule filter 13. The centering mechanism 80 thus prevents incomplete sealing and/or damage to the fittings 14, 15 due to misalignment. The centering mechanism 80 may also serve as a stop, limiting the advance of the fittings 14, 15 within each other and preventing over compression. Alternatively, stops may be provided elsewhere on the manifold and the capsule filter and/or the carriage.

As the carriage 11 is moved away from the manifold 12 from the engaged position to the disengaged position, the fittings 15 of the capsule filter 13 may be disengaged from the fittings 14 of the manifold 12. In some embodiments, the fittings 14, 15 of the manifold and the capsule filter 13 may remain engaged as the carriage 11 is moved to the disengaged position, the base assembly 23 of the carriage 11 moving away from the bottom of the capsule filter 13 as the carriage 11 moves to the disengaged position. The capsule filter 13 may then be removed from the manifold 12, e.g., by manually disengaging the fittings 15 of the capsule filter from the fittings 14 of the manifold 12.

Alternatively, the filtration system 10 may further comprise a disengagement mechanism which is operatively associated with the capsule filter 13 and automatically disengages the fittings 15 of the capsule filter 13 from the fittings 14 of the manifold 12 as the carriage 11 moves toward the disengaged position. The disengagement mechanism may be configured in a variety of ways. For example, the disengagement mechanism may be cooperatively arranged between the capsule filter 13 and the manifold 12. One example of such a disengagement mechanism 22 is shown in FIGS. 22 and 23 and comprises one or more springs 86 disposed between the capsule filter 13 and the manifold 12. The springs may be positioned in a variety of suitable locations between the capsule filter and the manifold. In the illustrated embodiment, a spring 86 is disposed around each centering pin 81. The springs 86 are compressed around the centering pins 81 as the carriage 11 is lifted to the engaged position by the mounting mechanism 16 and the fittings 15 of the capsule filter 13 are lifted into sealing contact with the fittings 14 of the manifold 12. As the carriage 11 is lowered to the disengaged position by the mounting mechanism 16, the springs 86 expand and automatically disengage the fittings 14, 15. The centering mechanism 80 also helps to maintain axial alignment of the fittings 14, 15 as the fittings 14, 15 are disengaged by the disengagement mechanism 22. The capsule filter 13 remains on the base assembly 23 of the carriage 11 as the carriage 11 is moved to the disengaged position In other embodiments, the disengagement mechanism may be cooperatively arranged between the capsule filter 13 and the carriage 11. One example of such a disengagement mechanism 22 is shown in FIGS. 1 and 4 and comprises one or more push rods 91 disposed between the carriage 11 and the capsule filter 13. The push rods may be positioned in a variety of suitable locations between the capsule filter and the carriage. In the illustrated embodiment, the push rods 91 are disposed in through holes 92 in the manifold 12 between the top of the capsule filter 13 and the top assembly 24 of the carriage 11. The push rods 91 may be lifted along with the capsule filter 13 and the carriage 11 as the carriage 11 is moved to the engaged position by the mounting mechanism 16. As the carriage 11 is lowered to the disengaged position by the mounting mechanism 16, the top assembly 24 of the carriage 11 may bear against the push rods 91. The push rods 91, in turn, bear against the top of the capsule filter 13, forcing the capsule filter 13 away from the manifold 12 and automatically disengaging the fittings 14, 15. The capsule filter 13 remains on the base assembly 23 of the carriage 11 as the carriage 11 is moved to the disengaged position.

Another example of a disengagement mechanism 22 cooperatively arranged between the carriage 11 and the capsule filter 13 is shown in FIGS. 24 and 25. (Components of the embodiment shown in FIGS. 24 and 25 have the same reference numbers as the analogous components of the embodiment shown in FIGS. 1-4.) The disengagement mechanism 22 generally comprises a fitment which physically couples the capsule filter 13 and the carriage 11 as the carriage 11 moves between the engaged position and the disengaged position. The fitment may be structured in a wide variety of ways. In the illustrated embodiment the fitment 96 comprises the engagement of the base assembly 23 of the carriage 11 with the capsule filter 13, e.g., with a flange 97 extending from the protrusion 35 in the bottom of the capsule filter 13 past the edges of the slot 34 in the base 26. As the carriage 11 is lowered to the disengaged position by the mounting mechanism 16, the base 26 of the carriage 11 bears against the flange 97 of the capsule filter 13, forcing the capsule filter 13 away from the manifold 12 and automatically disengaging the fitting 15 of the capsule filter 13 from the fittings 14 of the manifold 12. The capsule filter 13 remains on the base assembly 23 of the carriage as the carriage 11 is moved to the disengaged position.

Another example of a fitment is a flange which extends from each side assembly of the carriage over the top of the capsule filter. As the carriage is lowered by the mounting mechanism, the flanges of the side assemblies may bear against the top of the capsule filter, automatically disengaging the capsule filter from the manifold.

The manifold 12 may also be configured in a wide variety of ways. For example, the manifold may have any regular or irregular shape. As shown in FIGS. 1-4, the manifold 12 may have a box-shaped configuration including a front 100, a back 101, a top 102, a bottom 103 and opposite sides 104, 105. The manifold 12 may further include one or more conduits for transporting fluid to and/or from the capsule filter. Each of the conduits is preferably configured to reduce hold up volume and to avoid dead volumes or zones where the fluid can stagnate.

In many preferred embodiments, the manifold 12 is fluidly coupled to a pump 17. For example, the manifold 12 may be directly attached to the pump 17, e.g., along the back 101 of the manifold 12. The outlet of the pump 17 may be connected to an inlet conduit of the manifold 12 which extends through the manifold 12 and fluidly communicates, in turn, with the inlet fittings 14*a*, 15*a* of the manifold 12 and the capsule filter 13. Alternatively, the inlet conduit may be at least partially external to the manifold, e.g., extending externally from the pump to the manifold and hence to the inlet fittings. The manifold 12 may also include an outlet conduit 21 which fluidly communicates between the outlet fittings 14*b*, 15*b*, and any other appropriate component of the fluid system downstream of the manifold 12. In the illustrated embodiment, the outlet conduit 21 may extend from the outlet fittings 14*b*, 15*b*, through the manifold 12 to the front 100 of the manifold 12. However, the outlet conduit may extend from any portion of the manifold, including the top of the manifold. The manifold 12 may further include a vent conduit 20 which fluidly communicates between the vent fittings 14*c*, 15*c*, and any appropriate reservoir for the vented gas. Again in the illustrated embodiment, the vent conduit 20 may extend from the vent fitting 14*c*, 15*c*, through the manifold 12 to the front 100 of the manifold 12. However, the vent conduit may extend from any portion of the manifold, including the top of the manifold. In some embodiments, the vent conduit, as well as the vent fittings, may be eliminated entirely.

The number and configuration of the fittings 14 of the manifold 12, as well as the fittings 15 of the capsule filter 13, may be widely varied. In many embodiments the manifold 12 has three fittings 14*a*, 14*b*, 14*c*. However, a manifold may have more than three fittings or fewer than three fittings. For example, where a vent is not preferred or where the inlet to the capsule filter or the outlet from the capsule filter is not directed through the manifold, the manifold may have two fittings or only a single fitting.

The fittings 14 of the manifold 12, as well as the fittings 15 of the filter cartridge 13, may be structured in a variety of ways. For example, the fittings may be arranged in any regular or irregular pattern, such as a triangular pattern. Preferably, the fittings 14, 15 are generally aligned. Further, the spacing between the fittings, or the pattern of the fittings, may be symmetric but is preferably not symmetric. For example, as shown in FIG. 2, the distance between the vent fittings 14c, 15c, and the outlet fittings 14b, 15b may be less than the distance between the outlet fittings 14b, 15b, and the inlet fittings 14a, 15a. A unsymmetric spacing or pattern helps to prevent the capsule filter from being installed "backwards" on the manifold.

The fittings may be structured in various ways. For example, each of the fittings may comprise a nozzle or a port or receptacle which receives a nozzle. Some of the fittings on the manifold, or the capsule filter, may comprise nozzles while others comprise receptacles, or all of the fittings on the manifold may comprise nozzles or receptacles. In the illustrated embodiment, the fittings 14a, 14b, 14c of the manifold 12 all preferably comprise nozzles 110 and the fittings 15a, 15b, 15c, of the capsule filter 13 all preferably comprise corresponding receptacles 111 which receive the nozzles 110 of the manifold 12.

A wide assortment of nozzles and receptacles are suitable. However, the nozzle preferably includes a tip portion which contacts, and more preferably seals against, a corresponding surface in the receptacle. By contacting and/or sealing the tip portion of each nozzle with a corresponding surface in the receptacle, gaps or leakage volumes at the ends of the nozzles are eliminated, reducing the hold up volume and minimizing stagnant flow areas or dead zones within the filtration system, and the filtration system may be made smaller. To enhance the sealing engagement of the contact surface of the tip portion of each nozzle and the corresponding contact surface of the receptacle, at least the contact surface of the tip portion of the nozzle and the contact surface of the receptacle are preferably formed from different materials, one harder and the other of similar hardness or, more preferably, somewhat softer or more deformable. As the tip portion of the nozzle engages the contact surface of the receptacle, the softer material deforms to the harder material, forming a highly effective seal. The sealing engagement of the contact surface of the tip portion of the nozzle and the contact surface of the receptacle is preferably free of any additional sealing member, such as a gasket, at the contacting surfaces and may comprise the only or the primary seal between the fittings. However, additional seals spaced from the contacting surfaces, such as a supplemental O-ring seal, may also be provided between the nozzle and the receptacle. The seal formed by the contact surfaces may, for example, prevent any dead zones or stagnant portions from developing at the ends of the nozzle, while the supplemental O-ring seal may ensure a liquid and/or air tight seal between the fittings.

Either the tip portion of the nozzle or the contact surface of the receptacle may be formed from the harder material or the softer material. Because the capsule filter is preferably disposable and the manifold is preferably reusable, it is preferable to form the fitting on the manifold, e.g., either the nozzle or the receptacle on the manifold, from the harder material. Examples of harder materials include metal, such as stainless steel, and polymeric materials, such as polyethylene, e.g., HDPE, polypropylene, PFA, ETFE, ECTFE, and PCTFE (polychlorotrifluoroethylene), which may be relatively harder than the material in the corresponding fitting. Examples of softer materials include elasomeric-type materials, such as rubber, silicone, and polyurethane, and polymeric materials, such as LDPE, FEP, PFA and PTFE, which may be relatively softer than the material of the corresponding fitting. Generally, any suitable combination of relatively hard and relative soft materials may be used for the nozzle/receptacle arrangements based, for example, on a shore hardness D-scale, where PTFE is in the range from about 50 to about 56; ETFE is about 75; FEP is about 55; PFA is about 60; PCTFE is about 90; ECTFE is about 75; PVDF is in the range from about 70 to about 80; LDPE is in the range from about 40 to about 50; and HDPE and UHMWPE are in the range from about 60 to about 70.

The nozzles and receptacles may be structured in numerous ways. (Components of the embodiments shown in FIGS. 26-41 have the same reference numbers as the analogous components of the embodiments shown in FIGS. 1-25.) Some of the many examples of nozzle/receptacle arrangements are illustrated in FIGS. 26-41. In each of the illustrated embodiments, the nozzle is operatively associated with the manifold and the corresponding receptacle is operatively associated with the capsule filter. However, one or more of the nozzles may alternatively be associated with the capsule filter while the corresponding receptacle is associated with the manifold.

In the embodiment shown in FIGS. 26 and 27, the manifold 12 may comprise a body 115, e.g., a polymeric body, and may further comprise a bottom plate 116, e.g., a metal plate, mounted to the body 115. A nozzle 110, which is preferably unitarily formed with the body 115, extends through an aperture 118 in the bottom plate 116. A conduit 119, e.g., an inlet, outlet, or vent conduit, extends through the body 115 and the nozzle 110, opening in the tip portion 120 of the nozzle 110.

The receptacle 111 of the capsule filter 13 may comprise a collar 126, e.g., a polymeric collar, which has a region defining a bore 127. A seat 128, which preferably comprises a separate insert, may be positioned within the bore 127 on a ledge 129 of the collar 126. The seat 128 may be formed from a material different from the material of the nozzle 110 and also different from the material of the collar 126, the seat 128 being preferably formed from a material which is softer or harder than the material of the nozzle 110 or the collar 126. For example, the seat 128 may be formed from PTFE while the nozzle 110 and the collar 126 may be formed from polyethylene, PFA or PCTFE. A seal, such as an O-ring 130, may be positioned in the bore 127 on a rim of the seat 128 and around the interior of the collar 126. A cap 131 may be mounted to the collar 126 over the O-ring 130. The cap 131 has an opening 132 which is large enough to receive the nozzle 110. The opening 132 in the cap 131, as well as the collar 126, the seat 128, and/or the tip portion 120 of the nozzle 110, and may be tapered to facilitate insertion of the nozzle 110 into the receptacle 111. A conduit 133 extends through the collar 126 and at least partially through the seat 128 and opens onto the opening 132 in the cap 131.

The tip portion 120 of the nozzle 110 and the seat 128 each have a contact surface 140, 142 which may be similarly or differently shaped. The configuration of each contact surface 140, 142 may vary. For example, the contact surfaces 140, 142 of the tip portion 120 and the seat 128 may have curved or tapered configurations such as a spherical or conical configuration or a flat annular configuration. The area of the contact surfaces 140, 142 may be relatively wide but in many preferred embodiments, the area of at least one of the corresponding contact surfaces 140, 142 may be relatively narrow.

As the carriage moves from the disengaged position to the engaged position and the nozzle 110 is inserted into the receptacle 111, the O-ring 130 seals against the nozzle 110. The O-ring 130 may also seal again the rim of the seat 128, the inner wall of the collar 126 and/or the cap 131. In addition, the contact surfaces 140, 142 of the nozzle 110 and the receptacle 111 engage and at least the softer surface, e.g., the contact surface 142 of the seat 128, preferably deform to effectively seal against the harder surface, e.g., the contact surface 140 of the tip portion 120 of the nozzle 110. As the nozzle 110 bears against the seat 128, not only does the contact surface 142 of the seat 128 seal against the contact surface 140 of the nozzle 110, but the seat 128 also deforms and seals against the collar 128, e.g., against the ledge 129 and/or the inner wall of the bore 127 of the collar 126. By contacting and sealing the seat 128 against the tip portion 120 of the nozzle 110 and the collar 126 of the receptacle 111, no gaps or leakage volumes are created which can hold up fluid and cause dead zones or stagnant flow areas. Instead, the channel defined by the conduits 119, 133 extending through the nozzle 110 and the receptacle 111 provides a flow path free of hold up volumes, leakage volumes, and dead zones, as shown in FIG. 27.

In addition to reducing hold up volumes, leakage volumes and dead zones, the nozzle/receptacle arrangement provides a more reliable filtration system 10 and facilitates manufacture of the manifold 12 and the capsule filter 13. For example, the dimensional variations associated with the axial length of the nozzles 110, e.g., from the bottom plate 116 to the tip portion 120, may mean that nozzles 110 on the same manifold 12 have different lengths. This variation may be accommodated by the deformation of the seat 128. Longer nozzles 110 may deform the seat 128 slightly more than shorter nozzles 110 while both adequately seal the fittings.

In addition, eccentricities in the alignment and/or spacing of the nozzles 110 on the same manifold 12 may be accommodated by the deformation of the seat 128 and the use of an insert for the seat 128, or the nozzle 110. The seat 128 and/or the nozzle 110 may be arranged to move laterally as the fittings 14, 15, including the contact surfaces 140, 142, contact one another. For example, the outer diameter of the seat 128 may be slightly smaller than the diameter of the bore 127 in the collar 126, e.g., by about 0.2 mm. As the fittings 14, 15, including the mating tapered contact surfaces 140, 142, engage one another, they laterally adjust the position of the seat 128 within the bore 127, centering the seat 128 on the nozzle 110. Further, any slight tilt of the axis of the nozzle 110 may be accommodated by an asymmetrical deformation of the seat 128 about the axis of the nozzle 110.

Similar variations and eccentricities in the receptacle may also be accommodated. By accommodating these variations and eccentricities, abnormal stresses and strains on the nozzles and receptacles may be relieved, providing a more reliable filtration system. Further, neither the manifold nor the capsule filter need be manufactured to extremely tight tolerances, reducing the cost of manufacture.

Other examples of the nozzle/receptacle arrangements are shown in FIGS. 28-41 and may provide similar and/or additional features and advantages. (Components of the embodiments shown in FIGS. 28-41 have the same reference numbers as the analogous components of the embodiment shown in FIGS. 26 and 27.) The embodiment shown in FIGS. 28 and 29 is very similar to the embodiment shown in FIGS. 26 and 27. However, ridges 145 may extend from the ledge 129 of the collar 126 toward the seat 128. The engagement of the contacting surfaces 140, 142 of the nozzle 110 and the receptacle 111 deforms the ridges 145 and/or drives the ridges 145 into the seat 128 to better seal the seat 128 to the collar 126. Alternatively, the ridges may extend from the seat toward the ledge of the collar and may deform and/or be driven into and seal against the ledge as the nozzle engages the receptacle.

Figure 30:
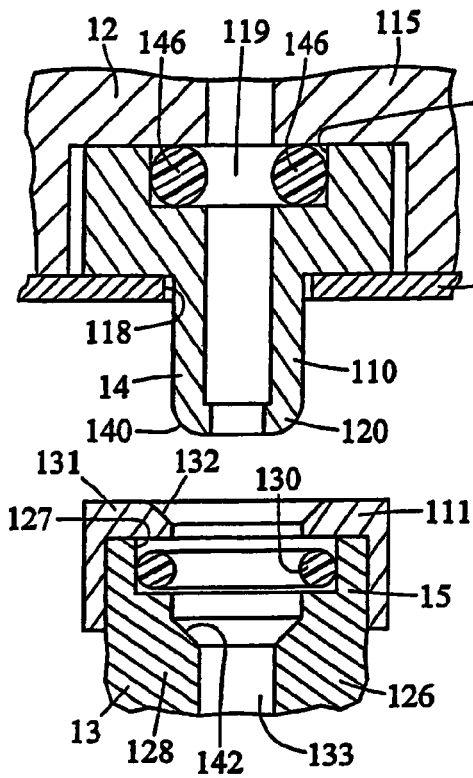
FIG. 30 is a sectional view of a nozzle/receptacle arrangement showing the nozzle and the receptacle disengaged.
Figure 31:
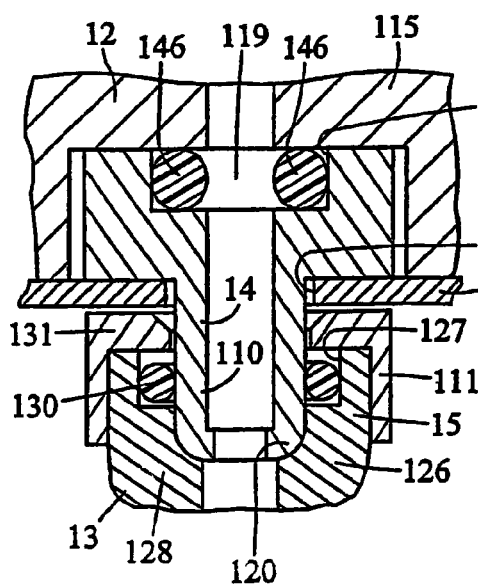
FIG. 31 is a sectional view of the nozzle/receptacle arrangement of FIG. 30 showing the nozzle and the receptacle engaged.

In the embodiment shown in FIGS. 30 and 31, the seat 128 may comprise a unitary portion of the collar 126 rather than an insert. However, the nozzle 110 preferably comprises an insert sealed to the body 115 of the manifold 12, e.g., by an O-ring 146 disposed in a bore 147 at the upper end of the nozzle insert. The nozzle 110 may be formed from a different material, e.g., a harder material, than the collar 126 of the receptacle 111 and/or from a different material than the body 115 of the manifold 12. Variations and eccentricities may be accommodated by movement of the insert and by deformation of one or both contacting surfaces, in a manner similar to that previously described. In addition, variation in the length of the nozzles 110 may be accommodated by axial compression of the O-ring 146. The contact surfaces 140, 142 are preferably semi-spherical and may have a relatively broad contact area.

Figure 32:
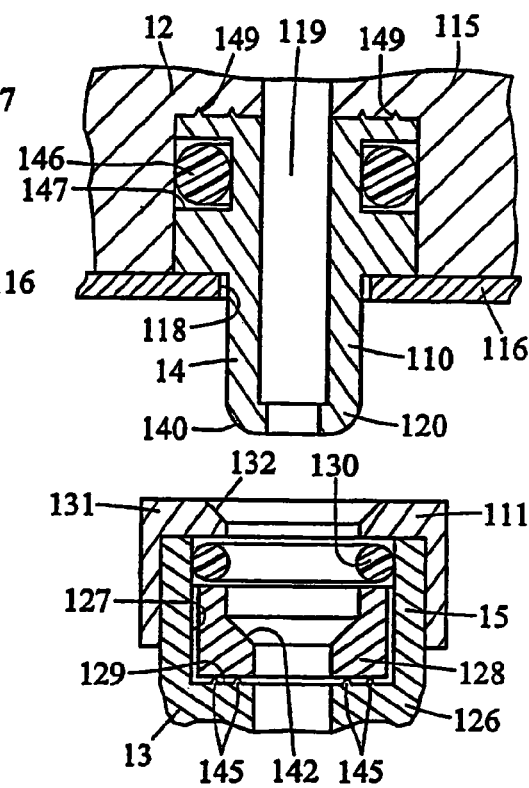
FIG. 32 is a sectional view of a nozzle/receptacle arrangement showing the nozzle and receptacle disengaged.
Figure 33:
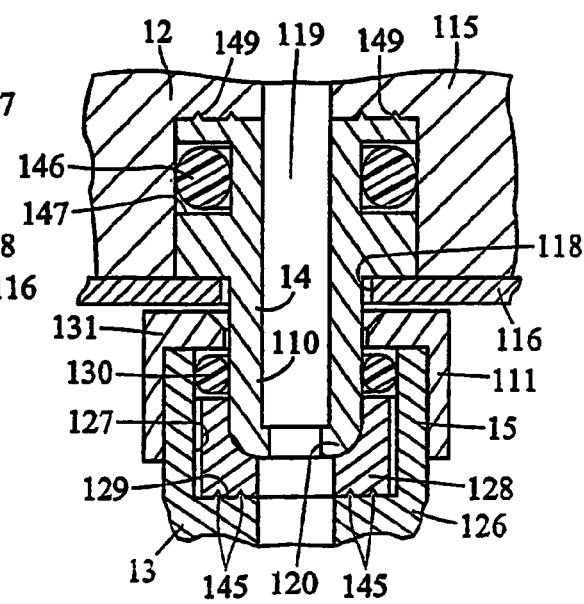
FIG. 33 is a sectional view of the nozzle/receptacle arrangement of FIG. 32 showing the nozzle and receptacle engaged.

The embodiment shown in FIGS. 32 and 33 is similar to the embodiment shown in FIGS. 30 and 31. However, both the nozzle 110 and the seat 128 may comprise inserts. The O-ring 146 sealing the nozzle insert is disposed in a groove 147 around the outer periphery of the insert. Further, ridges 149 may be disposed between the nozzle insert and the body 115 of the manifold 12, in addition to the ridges 145 between the seat insert and the ledge 129 of the collar 126. The ridges 149 may extend from the body 115 toward the nozzle insert 110 or from the nozzle insert 110 toward the body 115. The engagement of the contacting surfaces 140, 142 deforms the ridges 145, 149 and/or drives the ridges 145, 149 into the inserts to better seal the seat and nozzle inserts.

The embodiment shown in FIGS. 34 and 35 is similar to the embodiment shown in FIGS. 30 and 31. However, the receptacle 111 may not include a cap. Rather, the collar 126 may have a rim 150 which faces the manifold 12 and defines the opening 132 in the receptacle 111. The O-ring 130 which seals against the nozzle 110 is disposed in a groove 151 in the inner wall of the collar 126 which defines the bore 127. In addition, the contact surfaces 140, 142 preferably have a conical configuration and at least one of the contact surfaces 140, 142, e.g., the contact surface 142 of the seat 128, may have a relatively narrow contact area, which may enhance the seal between the contact surfaces 140, 142.

The embodiment shown in FIGS. 36 and 37 is similar to both the embodiment shown in FIGS. 34 and 35 and the embodiment shown in FIGS. 32 and 33. The contact surface 142 of the seat insert has the relatively narrow contact area.

Figure 38:
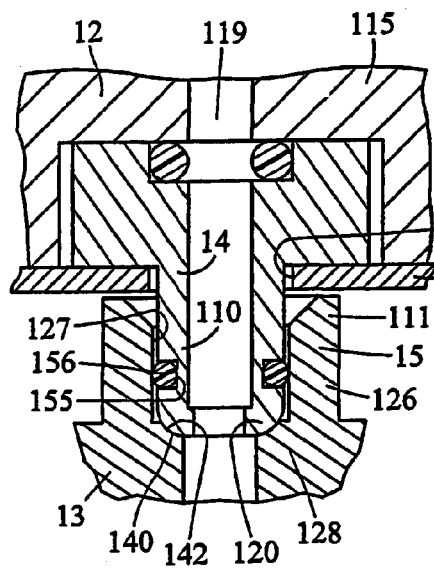
FIG. 38 is a sectional view of an alternative nozzle/receptacle arrangement.

The embodiment shown in FIG. 38 may comprise a nozzle 110, e.g., a nozzle insert, which has a groove 155 in the outer wall. An O-ring 156 is disposed in the groove 155 and provides a seal against the receptacle collar 126 which supplements the sealing engagement of the contact surfaces 140, 142.

Figure 39:
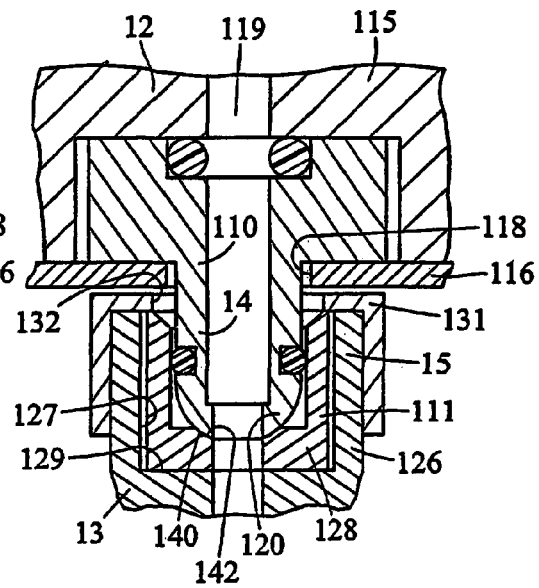
FIG. 39 is a sectional view of an alternative nozzle/receptacle arrangement.

The embodiment shown in FIG. 39 is similar to the embodiment shown in FIG. 38. However, the receptacle 111 may include a cap 131 and a seat insert 128 comprising a spherical contact surface having a relatively narrow contact area.

Figure 40:
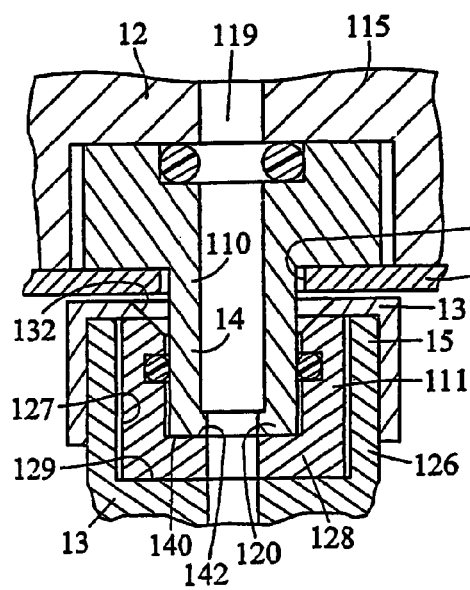
FIG. 40 is a sectional view of an alternative nozzle/receptacle arrangement.

The embodiment shown in FIG. 40 is similar to the embodiment shown in FIG. 39. However, the tip portion 120 of the nozzle 110 may have a cylindrical configuration and both contact surfaces 140, 142 may have flat, annular configurations with relatively small contact areas.

Figure 41:
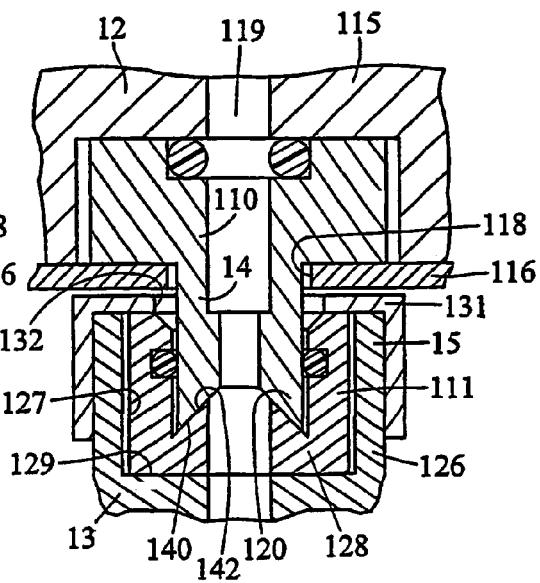
FIG. 41 is a sectional view of an alternative nozzle/receptacle arrangement.

The embodiment shown in FIG. 41 is similar to the embodiment shown in FIG. 40. However, the contact surfaces 140, 142 may have a reverse conical configuration in which the cone converges toward the axis of the nozzle 110 within the nozzle 110.

The fittings shown in FIGS. 26-41 include a nozzle and a corresponding receptacle having mating contact surfaces which preferably serve as a seal, e.g., a primary seal or even the sole seal, between the fittings. However, other fittings between the manifold and the capsule filter may be used. For example, fittings which are threaded, clamped and/or friction fitted to one another may be used to seal the manifold to the capsule filter.

Filters embodying the invention be configured in a variety of ways. One example of a filter embodying the invention is a capsule filter such as the capsule filter 13 shown in FIGS. 42-46. The capsule filter 13 generally comprises a housing 160 and a filter cartridge 161 removably or, preferably, permanently disposed in the housing 160.

The housing 160 may comprise a single piece structure but may be formed from any suitably impervious material, e.g., a metal or a polymeric material, and may have any desired shape, e.g., a generally cylindrical shape. In many preferred embodiments, the shape of the housing corresponds to the shape of the filter cartridge.

The housing 160 preferably comprises a multi-piece structure. For example, the housing 160 may include a bowl 162 and a head 163 removably or, preferably, permanently attached to the bowl 162. The bowl 162 may include a side wall and a bottom wall. A handle 159 may extend outwardly from the side wall of the bowl 162 and may be used to position the capsule filter 13 on the base assembly of the carriage with the protrusion 35 on the bottom of the capsule filter 13 engaged in the slot in the base.

The housing 160 has one or more fittings, e.g., an inlet fitting 15a, an outlet fitting 15b, and a vent fitting 15c. The inlet fitting 15a, and the outlet fitting 15b, define a fluid flow path through the housing 160. The fittings may be variously configured, e.g., as nozzles. In the embodiment illustrated in FIGS. 42-45, the fittings each comprise receptacles which may be similar to any of the receptacles previously described. One or more of the fittings may be disposed in the bowl, e.g., at the bottom or in the side wall of the bowl. Preferably, however, at least one and, more preferably, all of the fittings 15a, 15b, 15c are disposed in the head 163 on the top of the capsule filter 13.

Figure 46:
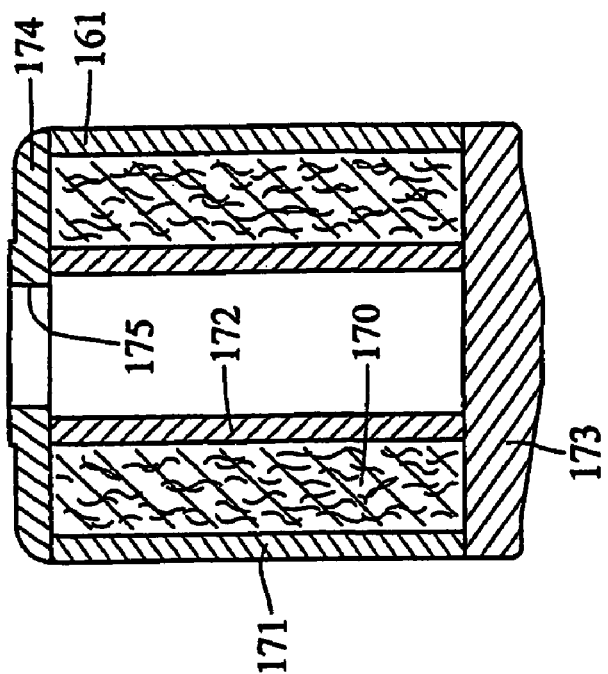
FIG. 46 is a side view of a filter cartridge of the capsule filter of FIG. 45.

The housing 160 preferably contains the filter cartridge 161 within a filter cartridge chamber in the fluid flow path. The filter cartridge preferably includes a filter element 170 having a filter medium, as shown in FIG. 46. The filter medium may comprise a solid or hollow porous mass, such as a cylindrical mass of sintered metal particles or a cylindrical mass of bonded and/or intertwined fibers, e.g., polymeric fibers. In many preferred embodiments, the filter medium may comprise a permeable sheet, e.g., a porous woven or non-woven sheet of fibers, including filaments, or a permeable or porous, supported or unsupported polymeric membrane, and the filter element 170 may have a cylindrical, hollow pleated configuration. The filter medium may be the sole layer of the pleated filter element 170 but is preferably one of two or more layers of a pleated composite further including, for example, one or more drainage layers, pre-filter layers, additional filter layers, substrates, and/or cushioning layers. The pleats of the filter element may extend radially or, preferably, non-radially, as disclosed, for example, in U.S. Pat. No. 5,543,047 which is incorporated by reference. As disclosed in U.S. Pat. No. 5,543,047 non-radially extending pleats each have a height greater than $(D-d)/2$ and less than or equal to $(D^2-d^2)/[4(d+2t)]$ where D and d are the outside and inside diameters, respectively, of the pleated filter element at the crests and roots of the pleat and t is the thickness of a pleat leg. Preferably, the height of each pleat is in the range from about 70% or 80% to about 100% of $(D^2-d^2)/[4(d+2t)]$. The non-radial pleats may be preferred because there is little or no space between the pleats, minimizing hold up volume and dead zones.

The hollow filter element 170 is preferably disposed between a cage 171 and a core 172. The ends of the filter element 170, the cage 171 and the core 172 may be sealed to end caps 173, 174, e.g., a blind end cap 173 and an open end cap 174. The open end cap 174 has an opening 175 which fluidly communicates with the interior of the hollow filter element 170. The open end cap may be sealed or attached to the housing with the opening in the open end cap, in turn, fluidly communicating with a fitting. For example, in the embodiment shown in FIGS. 42-45, the open end cap 174 may be bonded to the head 163 with the outlet fitting 15b preferably fluidly communicating with the interior of the filter element 170 via the opening 175 in the open end cap 174. The inlet fitting 15a preferably fluidly communicates with the exterior of the filter cartridge 161. Flow may then be directed outside in through the filter cartridge 161. Alternatively, the inlet fitting and the outlet fitting may be arranged to fluidly communicate with the interior and the exterior, respectively, of the filter cartridge, and flow may be directed inside out through the filter cartridge.

While the filter cartridge has been described in terms of a hollow filter element 170 having a pleated filter medium, a cage 171, a core 172 and end caps 173, 174, the filter cartridge is not limited to this embodiment. Numerous alternative filter cartridges are suitable. For example, the filter element may have a filter composite which is spirally wound rather than pleated. The cage and/or the core may be eliminated. Further, one or both end caps may be eliminated, and the ends of the filter element may be bonded directly to the top and/or bottom of the housing.

Figure 47:
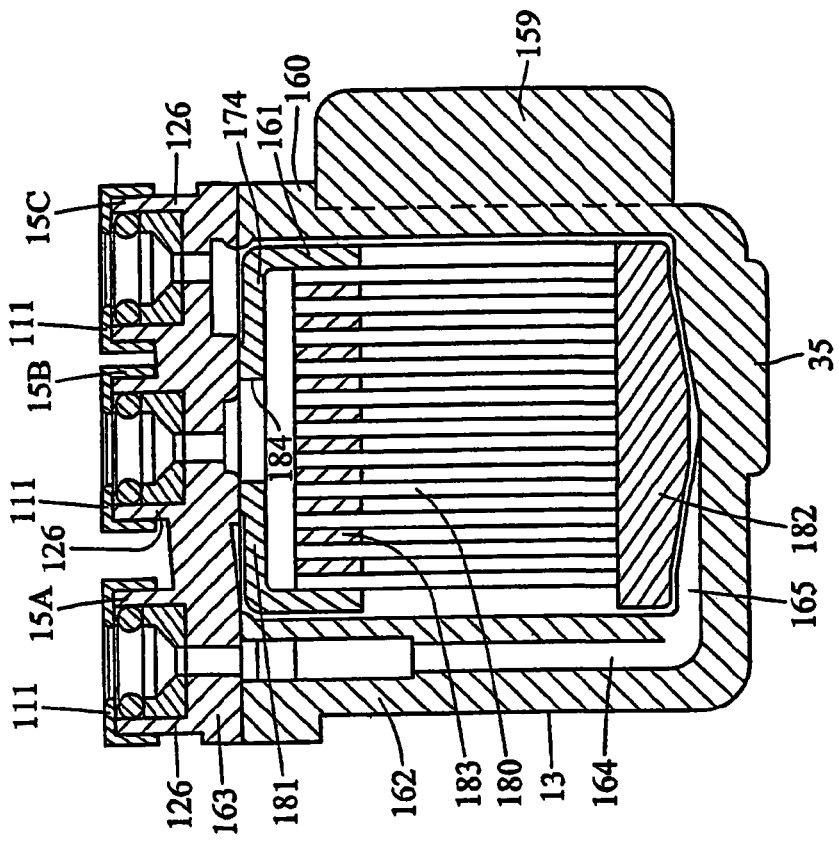
FIG. 47 is a sectional side view of an alternative capsule filter.

Yet other examples of filter cartridges may incorporate filter media comprising permeable hollow fiber media. For example, as shown in FIG. 47, a capsule filter 13 may comprise a filter cartridge 161 which may include permeable, e.g., porous, hollow fibers 180. (Components of the embodiment shown in FIG. 47 have the same reference numbers as the analogous components of the embodiment shown in FIG. 45.) The hollow fibers 180 may be contained between end caps 181, 182, e.g., an open end cap 181 and a blind end cap 182. In particular, the hollow fibers 180 may be potted in and extend from a partition 183 of the open end cap 181 and loop back to the partition 183, one or both of the ends of the hollow fibers 180 being an open end fluidly communicating with the opening 184 in the open end cap 181. A perforated cage 185 may extend between the end caps 181, 182 around the hollow fibers 180. Alternatively, both end caps may be open end caps and the cage may have no openings, the fluid being directed into the filter cartridge through the open lower end cap, or the cage and the blind end cap may be eliminated.

Figure 48:
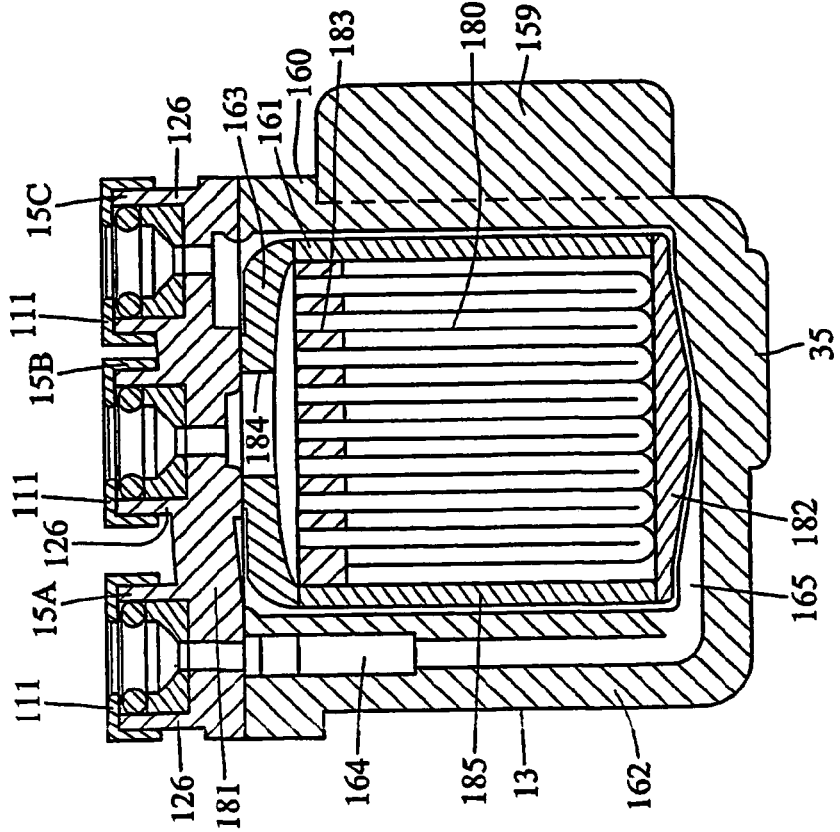
FIG. 48 is a sectional side view of an alternative capsule filter.

Another example of a capsule filter 13 comprising permeable hollow fibers 180 is shown in FIG. 48. (Components of the embodiment shown in FIG. 48 have the same reference numbers as the analogous components of the embodiment shown in FIG. 47.) In the embodiment shown in FIG. 48, the hollow fibers 180 extend between the partition 183 in the open end cap 181 and the blind end cap 182. One end of each hollow fiber 180 may be blindly potted in the blind end cap 182, while the other end is openly potted in the partition 183 in fluid communication with the opening 184 in the open end cap 181. A perforated cage may or may not extend between the end caps.

Figure 45:
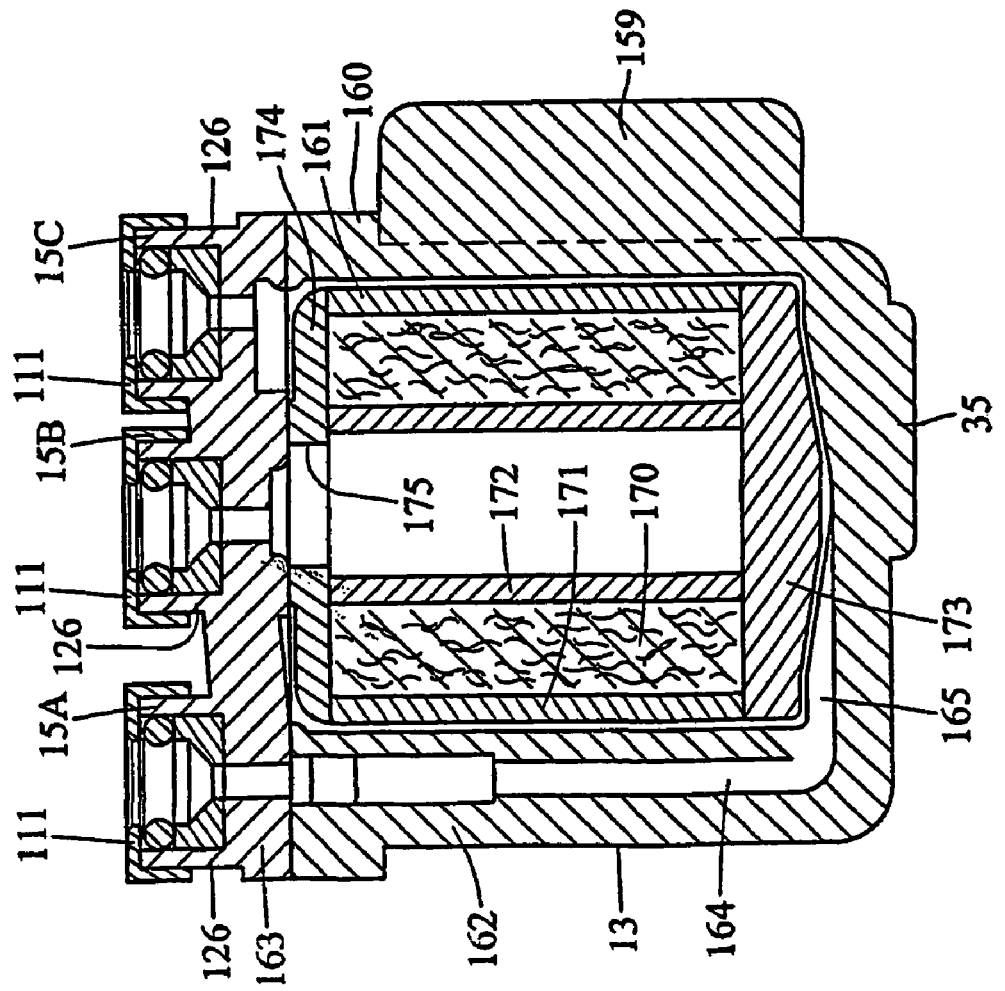
FIG. 45 is a sectional side view of the capsule filter of FIG. 42.

Regardless of the configuration of the filter cartridge, the interior of the housing is preferably fitted to the filter cartridge to minimize hold up volume and dead zones and to enhance fluid flow distribution and rise time within the housing. For example, as shown in FIG. 45, the interior side wall of the bowl 160 and the exterior of the filter cartridge 161 may be similarly shaped, and the bowl 160 preferably fits closely completely around the filter cartridge 161, defining an annular fluid flow distribution channel between the interior of the bowl 160 and the exterior of the filter cartridge 161. The annular channel is preferably dimensioned to reduce hold up volume and to allow a sweep of fluid flow around and/or axially along the filter cartridge without undue pressure drop between the inlet and outlet fittings. The desired dimensions of the annular channel may be determined empirically based on such factors as, for example, the viscosity of the fluid, the desired flow rates and pressure drop limits and the area of the inlet or outlet, e.g., the inlet fitting or the outlet fitting. For many embodiments, the axial cross sectional area of the annular channel may preferably be on the order of, e.g., approximately equal to, the area of the inlet nozzle.

Further, the interior bottom wall of the bowl 160 and the bottom of the filter cartridge 161 may also be similarly shaped and closely fitted to one another. The bottom of the filter cartridge may completely contact and may be attached to the bottom wall of the bowl, eliminating any space between them. However, in many preferred embodiments, the bottom of the filter cartridge is fitted to the bottom of the housing with one or more lower flow channels extending between them and communicating with the bottom of the annular flow channel. For example, the bottom of the filter cartridge, e.g., the bottom of the lower end cap, and/or the interior bottom wall of the housing may have one or more radially extending ribs or spokes. The filter cartridge and the housing may contact one another along the ribs and define the lower channels between them. Further, the interior bottom wall of the housing and/or the bottom of the filter cartridge preferably have a surface which is inclined upwardly to decrease the rise time of bubbles from the bottom of the filter. For example, the lower flow channels may incline upwardly toward the annular channel preferably at an angle of bout 15° or less, e.g., about 10° or less. The lower channels are preferably dimensioned to reduce hold up volume, to allow a sweep of fluid flow between the filter cartridge and the bottom of the housing without undue pressure drop between the inlet and outlet fittings, and/or to facilitate clearance of bubbles from the bottom of the filter. Again, the desired dimensions, including the degree of incline, of the lower channels may be determined empirically based factors such as fluid viscosity, desired flow rates, pressure drop limits and inlet/outlet areas.

The interior wall of the head 163 may fit closely to the top of the filter cartridge away from the vent fitting 15c but is preferably at least slightly spaced from the top of the filter cartridge 161 in the vicinity of the vent fitting 15c, allowing gases to rise from the annular flow distribution chamber and over the top of the filter cartridge 161 toward the vent fitting 15c. Preferably, the space between the interior wall of the head 163 and the top of the filter cartridge 161, e.g., the top of the upper end cap, increases continuously from a location most distant from the vent fitting 15c, to the vent fitting 15c. Nonetheless, while the space between the interior wall of the head 163 and the top of the filter cartridge 161 is preferably sufficient to vent gas from the capsule filter 13, it is also preferably small enough to avoid excessive hold up volume.

In many, but not all, preferred embodiments, the housing may comprise a fluid conduit, e.g., a fluid inlet conduit or a fluid outlet conduit, which extends from one of the fittings axially along the periphery of the filter cartridge chamber and is isolated from the filter cartridge chamber along a substantial length of the conduit, e.g., at least about 50 percent of the length of the conduit. For example, the fluid conduit may be disposed in the bowl, or adjacent to the bowl, and radially beyond the filter cartridge chamber. Preferably, the fluid conduit extends from a fitting at the top of the housing and opens into the filter cartridge chamber, e.g., the annular flow distribution channel, at the bottom of the housing. As shown in FIG. 45, the fluid conduit 164 may comprise an inlet conduit extending axially along the periphery of the filter cartridge chamber from the inlet fitting 15a, at the top of the housing 160 through the head 163 and the bowl 162 to the bottom of the housing 160. The inlet conduit 164 preferably communicates with the annular fluid flow distribution channel and the filter cartridge chamber only at the bottom of the housing 160 and, therefore, is isolated from the filter cartridge chamber for at least about 70 percent, more preferably at least about 80 percent or at least about 90 percent, of the length of the conduit 164.

The housing may also preferably comprise a radial passage through the side wall and/or more preferably in the interior bottom wall of the housing which extends from the side wall of the bowl 162 and fluidly communicates with the axial fluid conduit. The radial passage may extend along the lower end cap or along the bottom wall of the housing or along both, e.g., between the lower end cap and the bottom wall. For example, the radial passage may extend from the bottom of the fluid conduit, under the filter cartridge, e.g., under the lower end cap. The radial passage may extend completely under the filter cartridge but preferably extends only part way under the filter cartridge. As shown in FIG. 45, the radial passage 165 extends from the bottom of the fluid conduit 164 under the filter cartridge 161, terminating near the center of the filter cartridge chamber of the housing 160. The radial passage 165 may have a uniform cross section or a tapered cross section, e.g., the cross section may decrease with increasing distance from the side wall of the bowl 162. The radial passage 165 may feed fluid to, or receive fluid from, the lower flow channels between the bottom of the filter cartridge 161 and the bottom wall of the bowl 162 and may fluidly communicate between the lower flow channels and the axial fluid conduit. Alternatively, the radial passage may be eliminated, e.g., where there are no lower flow channels between the bottom of the filter cartridge and the bottom wall of the bowl.

Further, in many preferred embodiments the filter cartridge may comprise a keying mechanism cooperatively arranged between the housing and the filter cartridge to center the filter cartridge in the filter cartridge chamber of the housing and provide a uniform annular flow channel. The keying mechanism may have any of numerous suitable structures. For example, the keying mechanism may comprise one or more centering pins and mating centering apertures on the housing and the filter cartridge similar to the centering mechanism 80 previously described.

More preferably, one or both of the end caps, e.g., the lower end cap and the corresponding wall of the housing may have mating shapes which center the filter cartridge in the filter cartridge chamber as the filter cartridge is mounted within the housing. The shapes may, for example, comprise curved or tapered configurations, e.g., a partially spherical, elliptical or conical configuration, on one or both end caps and the corresponding wall of the housing. As shown in FIG. 45, the lower end cap 173 may have a generally conical configuration which mates with a conical configuration in the interior bottom wall of the bowl 162 of the housing 160. The configurations are located and shaped to center the filter cartridge 161 in the filter cartridge chamber. Thus, as the filter cartridge 161 is mounted within the bowl 162 with the configuration of the lower end cap 173 contacting the configuration of the interior bottom wall of the bowl 162, the filter cartridge 161 automatically centers itself within the filter cartridge chamber of the bowl 162 due to the mating engagement of the conical configurations. The head 163 may then be attached to the bowl 162 and the upper end cap 174 of the filter cartridge 161. A keying mechanism, such as mating configuration, e.g., conical configuration, in the interior wall of the head 163, e.g., the region of the head 163 near the outlet fitting 15b, and on the upper end cap 174, may center the filter cartridge 161 on the head 163 as well as the bowl 162.

The housing including one or more of the axial fluid conduit, the radial passage, and/or the keying mechanism may be fabricated in any suitable manner. For example, a molded bowl 162 is illustrated FIGS. 49 and 50. The bowl 162 may be molded in two pieces, e.g., a side wall piece 195 and a bottom wall piece 196, and the two pieces 195, 196 may be attached, e.g., welded or bonded, to form the bowl 162. In the illustrated embodiment, the bowl 162 includes an axial fluid conduit 164, a radial passage 165, a filter cartridge chamber, and a centering configuration 191 in the interior bottom wall of the bowl 162.

Alternatively or additionally, the housing may be machined. For example, a machined bowl 162 is illustrated in FIGS. 51 and 52. The machined bowl 162 preferably comprises a unitary piece 197. A filter cartridge chamber and an axial fluid conduit 164 may be bored in the unitary piece 197. A radial passage 165 may be bored through the side wall of the unitary piece 197, and the exterior end of the radial passage 165 may be plugged or fitted with a fitting.

Figure 53:
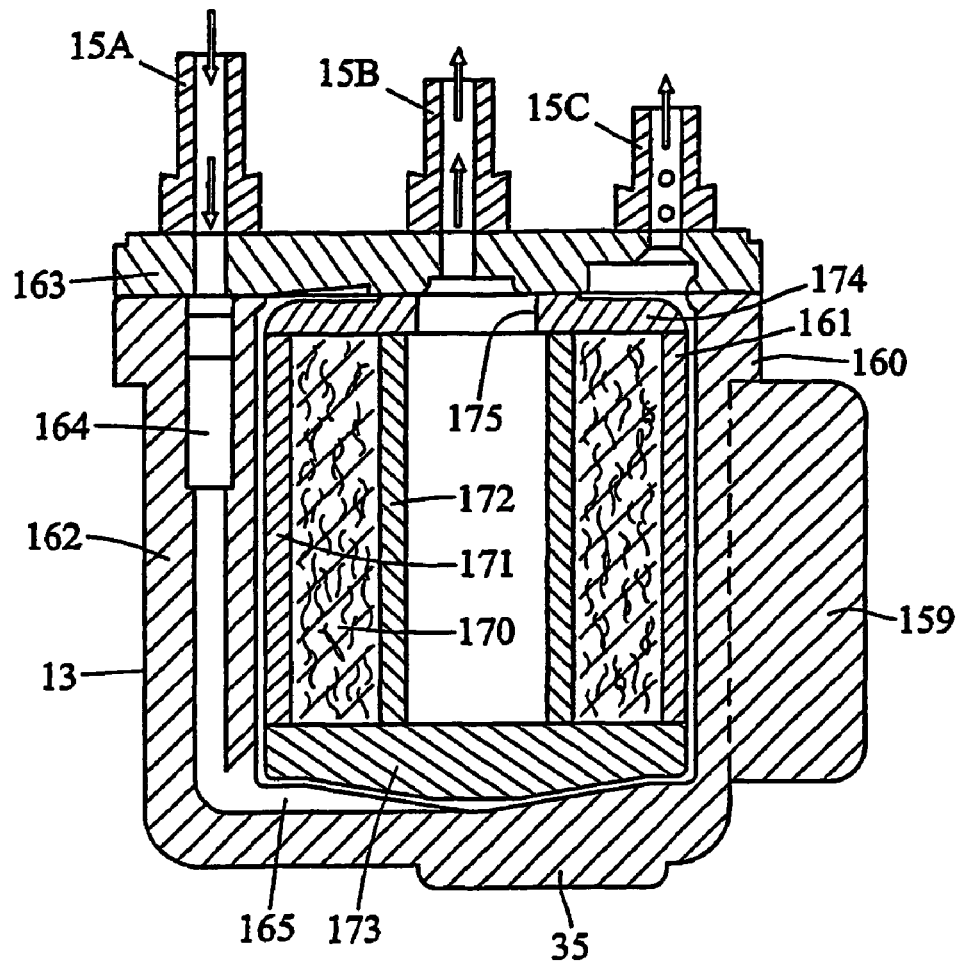
FIG. 53 is a sectional side view of an alternative capsule filter.
Figure 54:
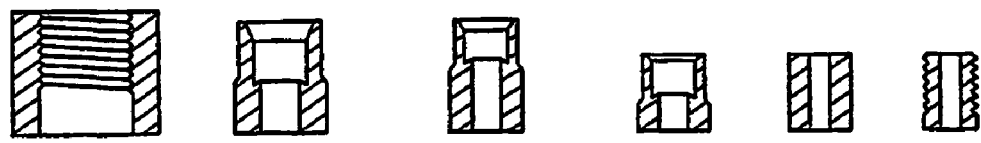
FIG. 54 is a sectional side view of alternative fittings for a capsule filter.

Other examples of capsule filters which embody the invention and which may be used in one or more of the previously disclosed filtration systems are shown in FIGS. 53-58, all of which may provide similar and/or additional features and advantages of the embodiment shown in FIG. 45. (Components of the embodiments shown in FIGS. 53-58 have the same reference numbers as the analogous components of the embodiment shown in FIG. 45.) The embodiment of the filter shown in FIG. 53 may be similar to the embodiment shown in FIG. 45. The capsule filter 13 shown in FIG. 53 may include an axial fluid conduit 168, a radial passage 165, and a keying mechanism such as mating configurations on the lower end cap 173 and the interior bottom wall of the bowl 162 and/or on the upper end cap 174 and the interior wall of the head 163. Further, the housing 160 may closely fit to the filter cartridge 161, and/or the filter cartridge 161 may have non-radially extending pleats. However, the fittings 15a, 15b, 15c, of the capsule filter 13 shown in FIG. 53 may differ from the fittings 15a, 15b, 15c, of the capsule filter 13 shown in FIG. 45. Examples of various other types of fittings 15 which may be used with this or any of the other embodiments of the filter are shown in FIG. 54.

Figure 55:
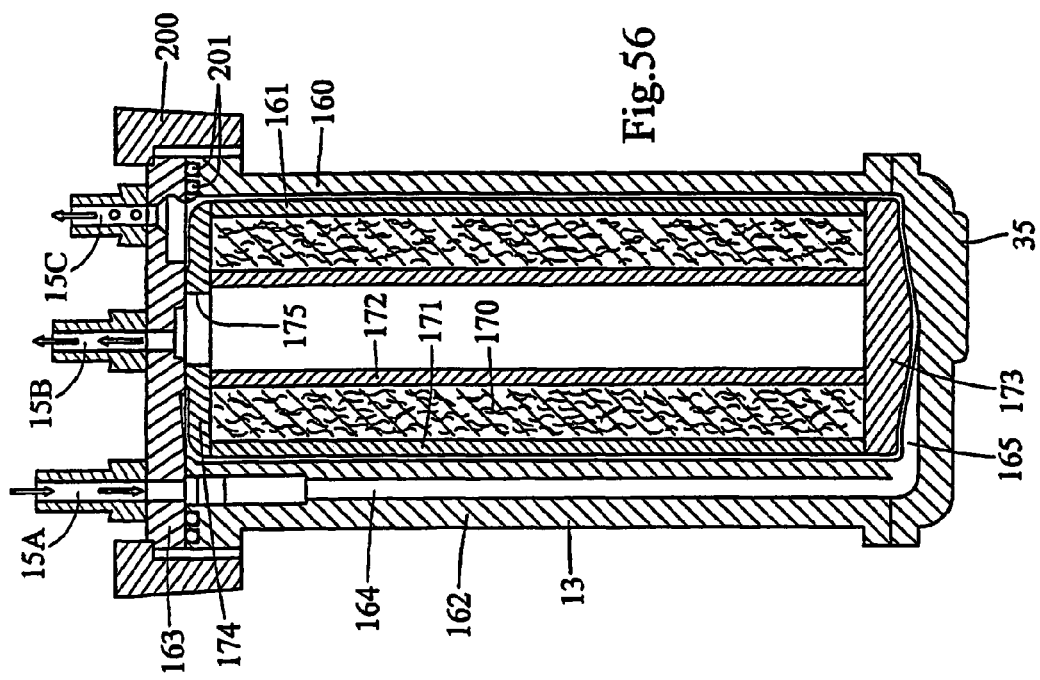
FIG. 55 is a sectional side view of an alternative capsule filter.

The embodiment of the filter shown in FIG. 55 is similar to the embodiment shown in FIG. 53. The capsule filter 13 shown in FIG. 55, as well as the capsule filter 13 shown in FIG. 56, may also include an axial fluid conduit 164, a radial passage 165, a keying mechanism, e.g., an upper keying mechanism and/or a lower keying mechanism, a close fit between the housing 160 and the filter cartridge 161, and/or a filter cartridge having non-radially extending pleats. However, in the capsule filter 13 shown in FIG. 55 the bowl 162 and the filter cartridge 161 may be longer than those in the embodiment of FIG. 53.

Figure 56:
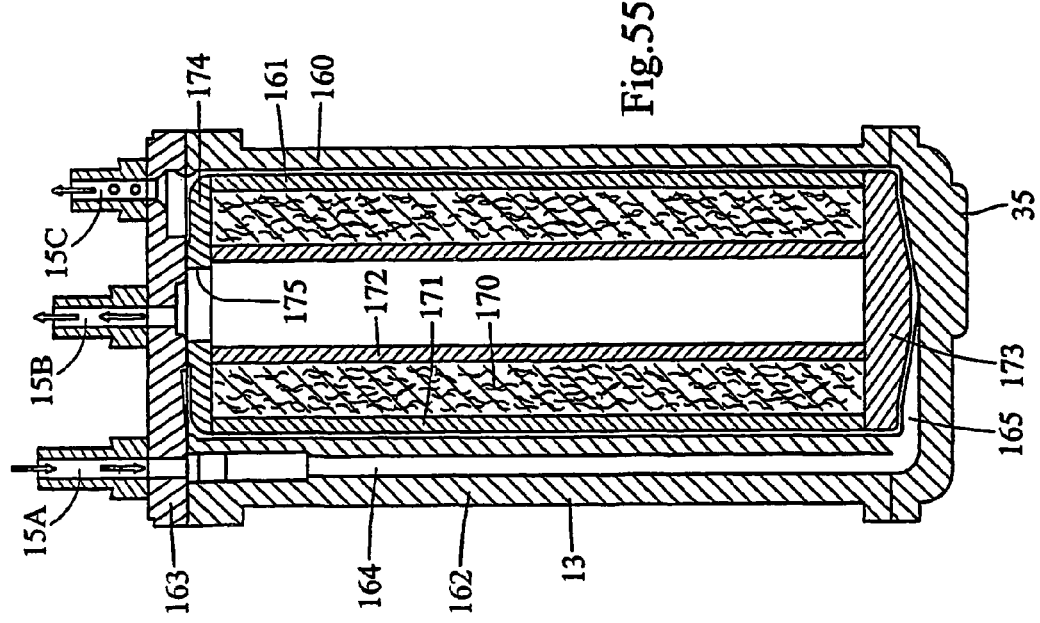
FIG. 56 is a sectional side view of an alternative capsule filter.

The embodiment shown in FIG. 56 is similar to the embodiment shown in FIG. 55. However, the capsule filter 13 shown in FIG. 56 may have a head 163 which is removably mounted to the bowl 162. The head may be removably fastened to the bowl in any suitable manner. For example, the head 163 may be fastened to the bowl 162 by a ring nut 200. One or more O-rings 201 may be used to seal the head 163 to the bowl 162. Alternatively, the heat may be threaded directly to the bowl or bolted to the bowl.

Figure 58:
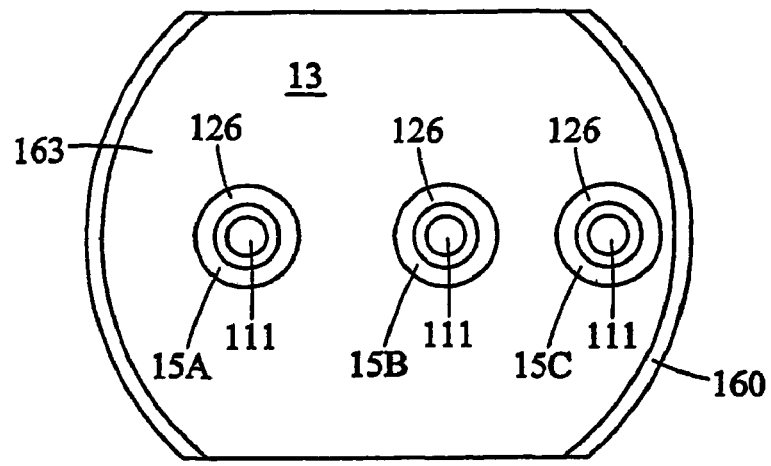
FIG. 58 is a top view of the capsule filter of FIG. 57.
Figure 57:
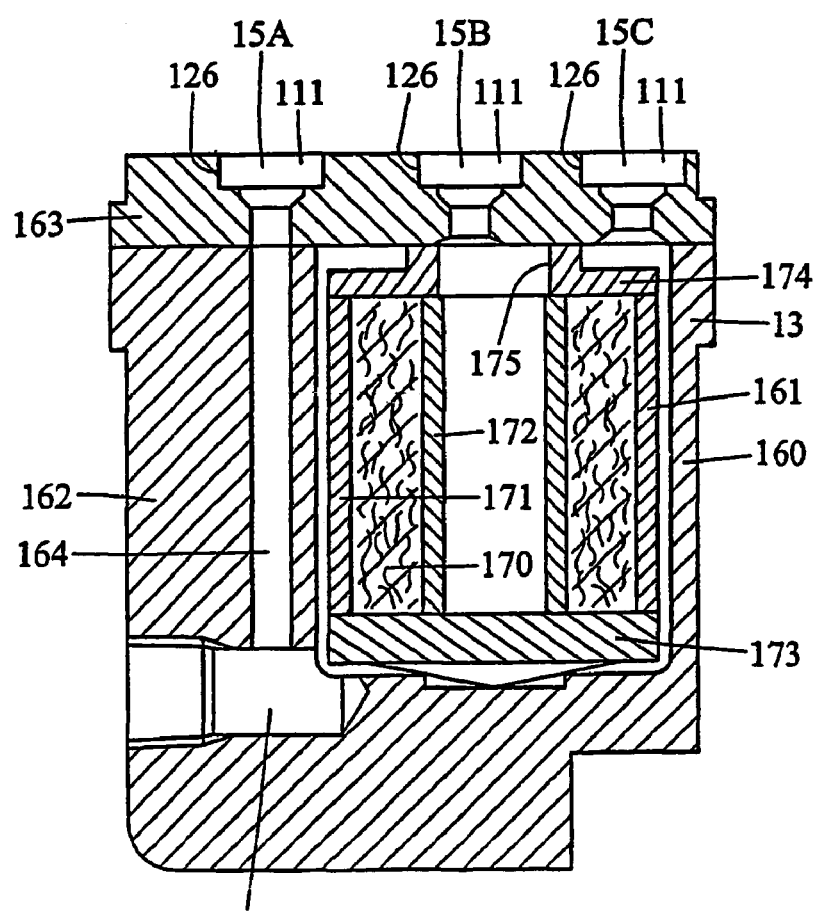
FIG. 57 is a sectional side view of an alternative capsule filter for use with the filtration system of FIG. 8.

The embodiment of the filter shown in FIGS. 57 and 58 may be useful in one or more of the previously disclosed filtration systems, including the filtration system 10 shown in FIGS. 8-13. The capsule filter 13 may include an axial fluid conduit 164, a radial passage 165, and a keying mechanism. The keying mechanism may comprise dissimilar shapes on the lower end cap 173, e.g., a generally conical shape, and on the interior bottom wall of the bowl 162, e.g., a generally cylindrical depression, which nonetheless fit to each other to center the filter cartridge 161 in the filter cartridge chamber. The open exterior end of the radial passage 165 in the housing 160 may be plugged or may be equipped with a fitting, as previously disclosed.

Filters embodying the present invention may be useful in any of the previously disclosed filtration systems, but the invention is not limited to these embodiments. For example, capsule filters which embody the invention or may but may not be useful in the previously disclosed filtration systems are shown FIGS. 59-63. (Components of the embodiments shown in FIGS. 59-63 have the same reference numerals as the analogous components of the embodiments shown in FIG. 45 and the FIGS. 53-58.) The embodiment shown in FIGS. 59 and 60 may have an N-type fitting arrangement. The inlet fitting 15a, may be disposed, for example, in the bottom wall of the bowl 162. Fluid enters the capsule filter 13 via a conduit which extends from the inlet fitting 15a, to lower fluid channels between the lower end cap 173 and the interior bottom wall of the bowl 162. From the lower fluid channels, the fluid flows to the annular fluid distribution channel between the filter cartridge 161 and the housing 160. The fluid may thus sweep evenly under the filter cartridge 161 radially and along the length of the filter cartridge 161 axially. The outlet fitting 15b, and the vent fitting 15c may be disposed in the head 163. A keying mechanism, such as mating configurations, may be arranged between the lower end cap 173 and the interior bottom wall of the bowl 162 and/or between the upper end cap 174 and the interior wall of the head 163. The housing 160 may fit closely around the filter cartridge 161 and/or the filter cartridge 161 may include non-radially extending pleats.

Figures 59, 61:
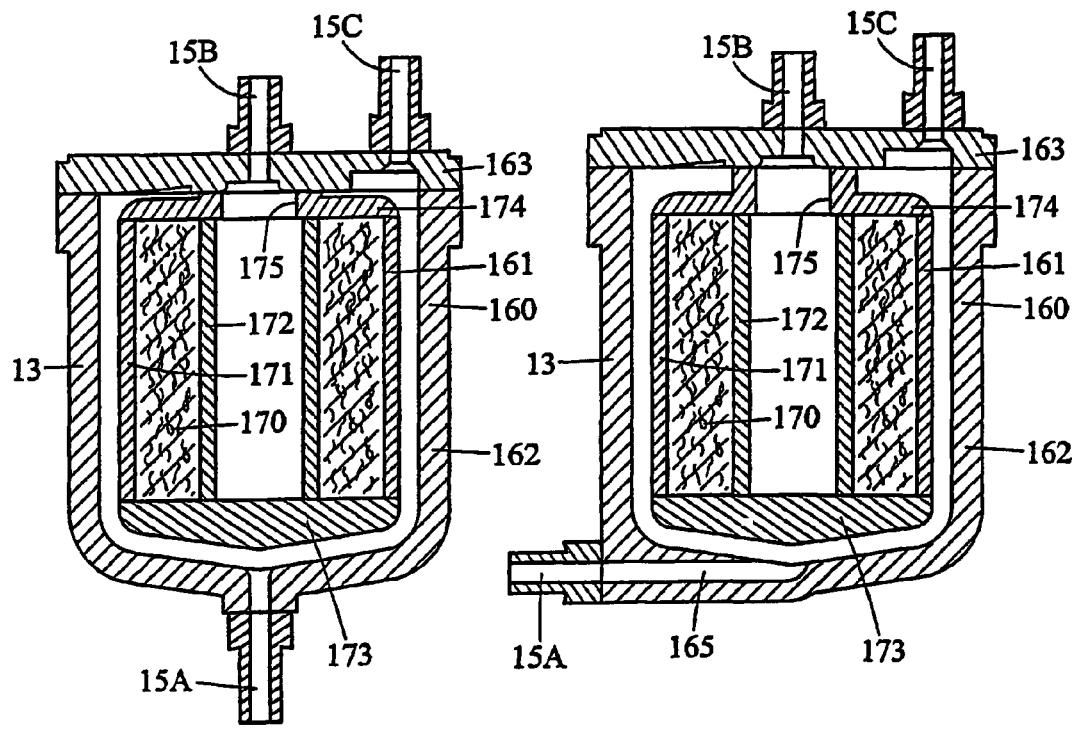
FIG. 59 is a sectional side view of an alternative capsule filter.
FIG. 61 is a sectional side view of an alternative capsule filter.
Figures 60, 62:
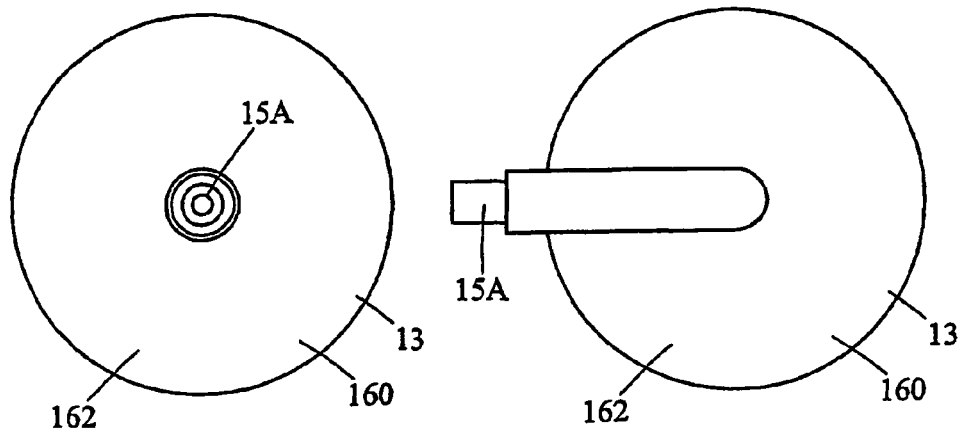
FIG. 60 is a bottom view of the capsule filter of FIG. 59.
FIG. 62 is a bottom view of the capsule filter of FIG. 61.

The embodiment of the filter shown in FIGS. 61 and 62 may be similar to the embodiment shown in FIGS. 59 and 60. For example, the capsule filter 13 shown in FIGS. 61 and 62 may have a keying mechanism at the top and/or the bottom of the capsule filter 13, a housing 160 which fits closely to the filter cartridge 161, and/or a filter cartridge 161 which has non-radially extending pleats. However, capsule filter 13 may have an L-type fitting arrangement wherein the inlet fitting 15a, may be disposed in the housing 160 at the side of the housing 160. A radial passage 165 extends from the inlet fitting 15a and fluidly communicates with the lower channels in the housing 160 and hence the angular flow distribution channel around the filter cartridge 161. In some of the previous embodiments, the top portion of the radial passage was open to the annular channel and the lower channels along much of the length of the radial passage. In the capsule filter 13 shown in FIGS. 61 and 62, the radial passage 189 may be isolated from the filter cartridge chamber over much of its length, e.g., between the inlet fitting 15a and the lower channels at the center of the filter cartridge 161.

Figure 63:
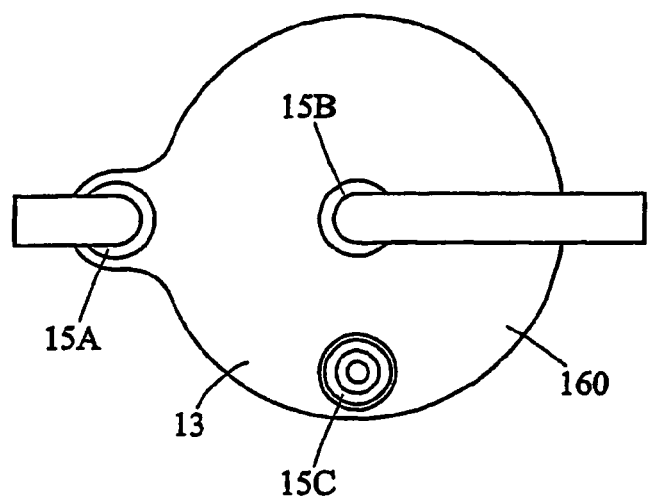
FIG. 63 is a top view of an alternative capsule filter.

The embodiment of the filter shown in FIG. 63 may be similar to the embodiment shown in FIGS. 61 and 62 but may have a T-flow fitting arrangement. The inlet fitting 15a, the outlet fitting 15b, and the vent fitting 15c may each be disposed in the head 163 of the capsule filter 13 in a generally triangular pattern.

Filters embodying one or more aspects of the invention, including capsule filters having one or more of the axial fluid conduit, the radial passage, and/or the keying mechanism, have many advantages and represent a significant advance in the art. These features are even more valuable when combined with the close fit between the housing and the filter cartridge and the non-radial pleats of the filter cartridge. For example, the axial fluid conduit allows the fluid to sweep evenly along the axial length of the filter cartridge from the bottom to the top of vice versa, reducing or eliminating dead zones at the bottom or top of the annular channel. The radial passage coupled to the lower channels under the lower end cap further enhances the even sweep and distribution of fluid flow under the filter cartridge and in the annular fluid channel around the filter cartridge and further avoids dead zones at the bottom of the annular channel. The keying mechanism ensures that the filter cartridge is centered in the filter cartridge chamber and provides a uniform annular channel, even further enhancing the even distribution of fluid flow around the filter cartridge. These advantages combined with the low hold up volume provided by the close fit between the housing and the filter cartridge and by the non-radial pleats of the filter cartridge provide a filter with far superior performance than conventional filters with respect to reducing hold up volume and dead zones, providing an even distribution of fluid flow upward, or downward, along the filter cartridge; sharpening rise time; and minimizing the time to output a fluid which has a desired level of cleanliness and is substantially free of gas bubbles.

Example 1

Figure 64:
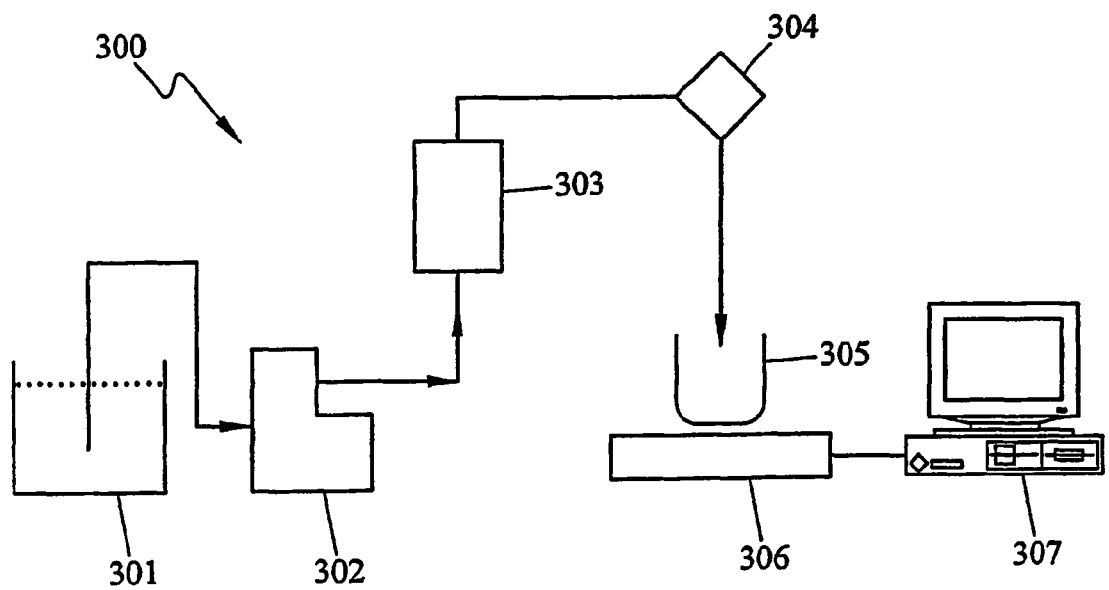
FIG. 64 is a test system.
Figure 65:
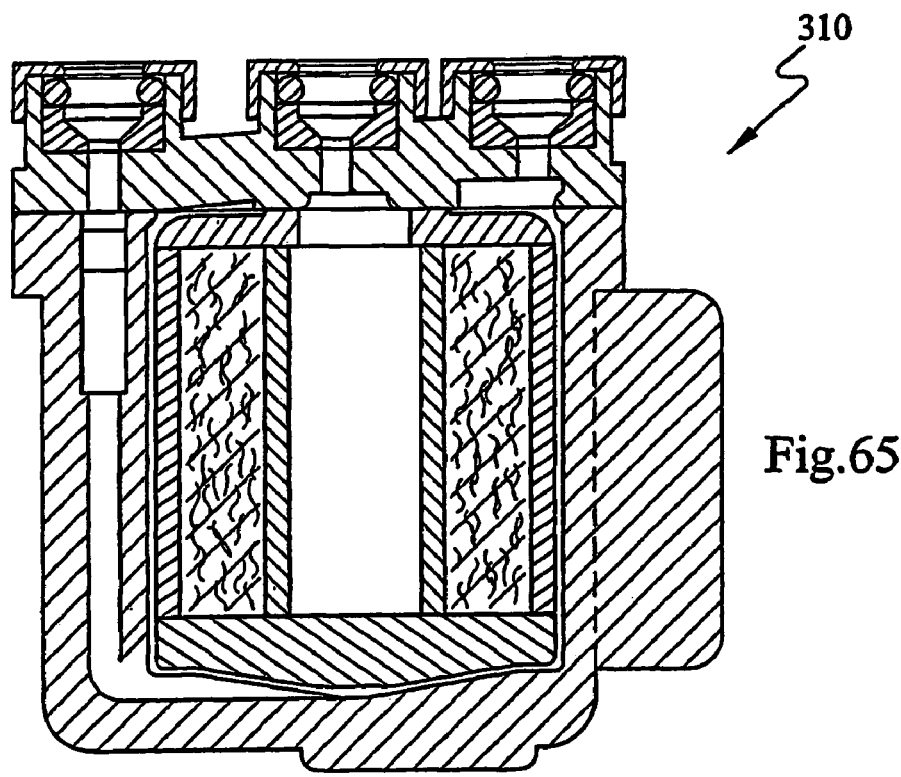
FIG. 65 is a first filter used in the test system of FIG. 64.
Figure 66:
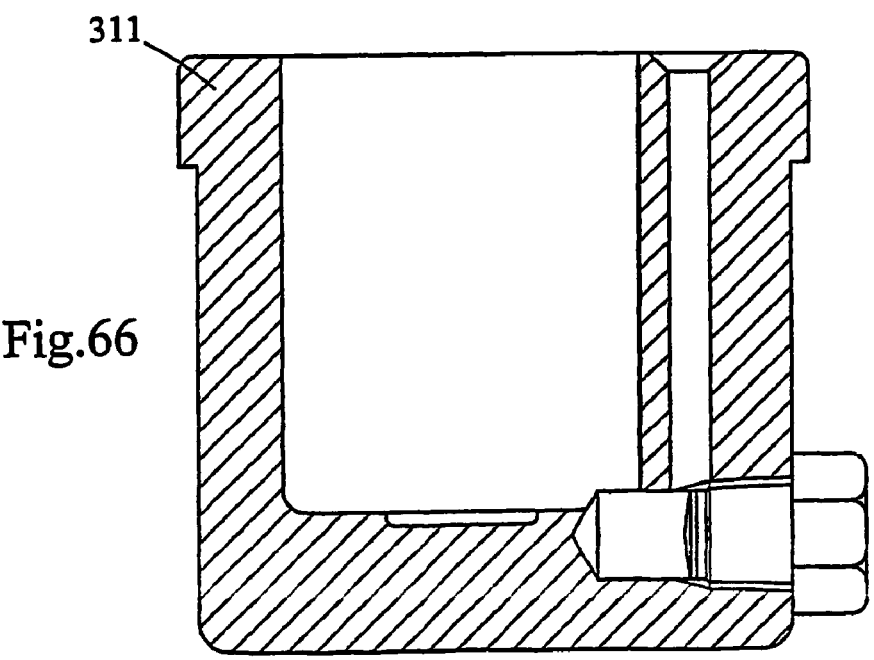
FIG. 66 is a bowl used for the first filter of FIG. 65.
Figure 67:
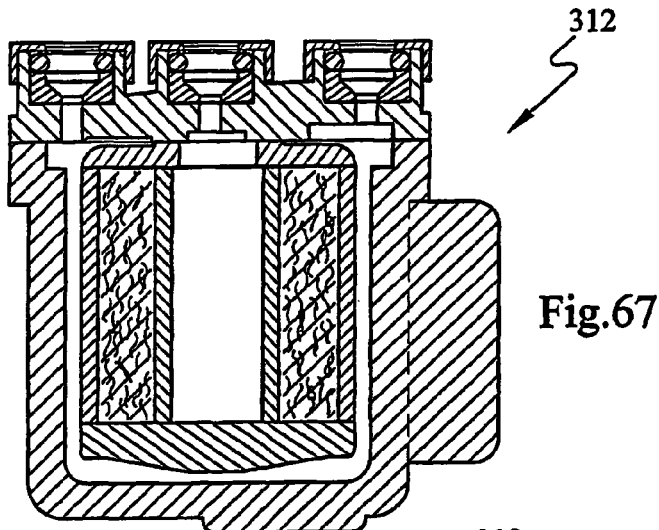
FIG. 67 is a second filter used in the test system of FIG. 64.
Figure 68:
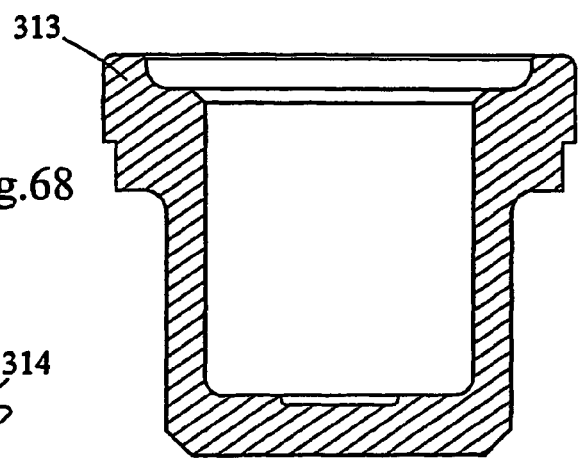
FIG. 68 is a bowl used for the second filter of FIG. 67.
Figure 69:
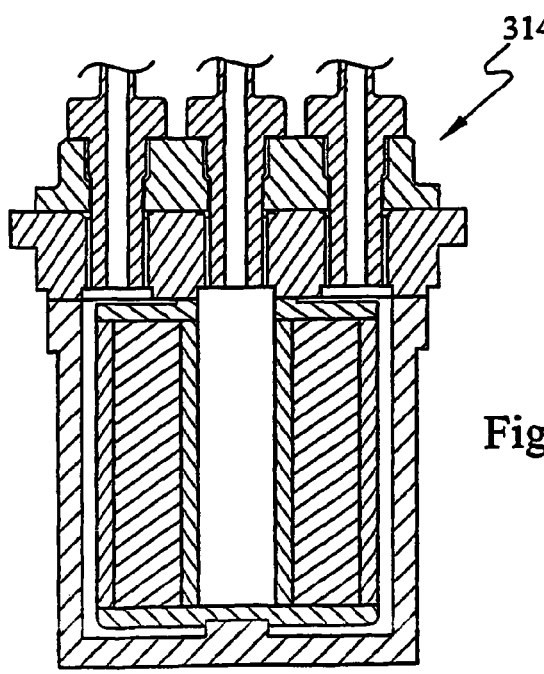
FIG. 69 is a third filter used in the test system of FIG. 64.

A test system 300 shown in FIG. 64 is used to evaluate liquid displacement in a first filter, a second filter, and a third filter as a dispense liquid is dispensed through the filters. The test system 300 includes a dispense liquid container 301, a dispense pump 302, a housing 303, a drawback 304, a container 305 on a balance or scale 306, and electronics 307, such as a PC, coupled to the scale 306. The first filter, which is similar to the capsule filter 310 shown in FIG. 65 but utilizes the bowl 311 shown in FIG. 66, has a filtration area of 660 cm$^2$ and a hold up volume of 42 cc. The second filter, which is similar to the capsule filter 312 shown in FIG. 67 but utilizes the bowl 313 shown in FIG. 68, also has a filtration area of 660 cm$^2$ and a hold up volume of 42 cc. The third filter, which is similar to the capsule filter 314 shown in FIG. 69, has a filtration area of 2800 cm$^2$ and a hold up volume of 130 cc. The hold up volume of each filter is the inner volume of the filter housing, including the bowl, minus the hardware volume of the filter cartridge.

To monitor dispense weight, two kinds of liquids, which have different specific gravities, are used:
hexyleneglycol (s.g.=0.923 at 20 deg. C, vis.=34.4 m Pa·s at 20 deg. C., s.t.=27 mN/m at 20 deg. C.) and
ethyleneglycol (s.g.=1.11 at 20 deg. C, vis=25.66 mPa·s at 16 deg. C., st=46 m N/m at 20 deg. C).

The dispense is carried out pulsationally rather than continuously, and the dispense cycle has a 6 sec. dispense time and a 12 sec. wait time. The dispense weight for the hexyleneglycol is approximately 3.05 g/shot and for the ethyleneglycol is approximately 3.70 g/shot. The minimum range is 0.001 g.
The test procedure is as follows:
a test filter is installed in the housing;
hexyleneglycol is run through the filter and the housing is then filled with liquid;
ethyleneglycol is passed through the filter wetted by the hexyleneglycol;
hexyleneglycol is displaced with ethyleneglycol;
the weight of fluid filtered is measured as a function of time during displacement;
ethyleneglycol is displaced with hexyleneglycol; and
the weight of fluid filtered is measured as a function of time.

Figure 70:
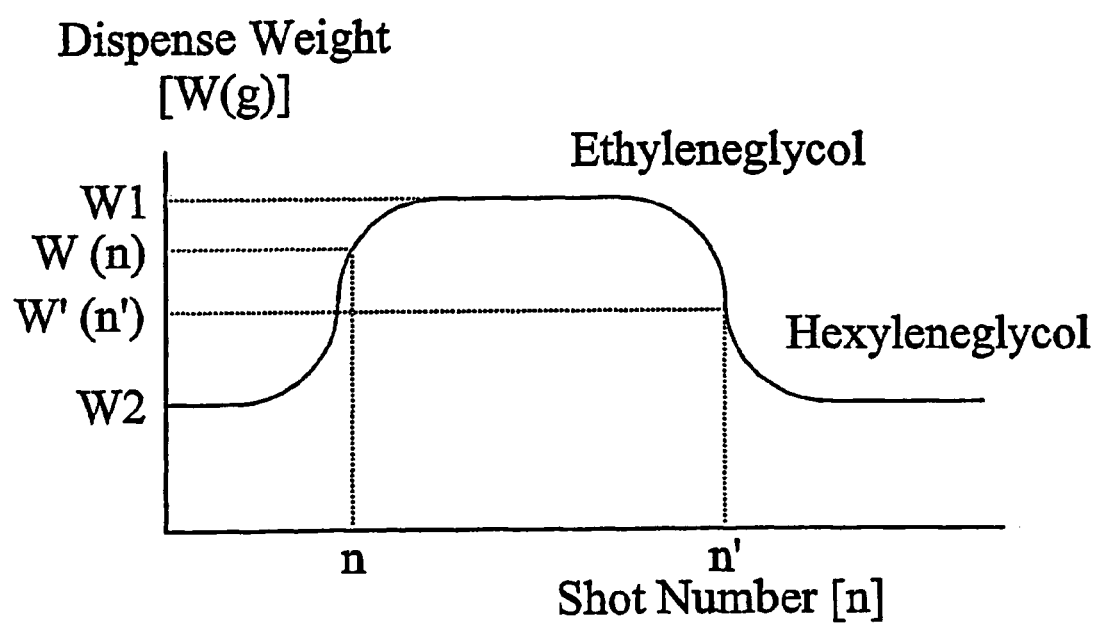
FIG. 70 is a graph of raw data.

The raw data is presented in FIG. 70. The raw data is converted into W values as follows:
displacement from hexyleneglycol to ethyleneglycol corresponds to $W=W1-W(n)$;
displacement from ethyleneglycol to hexyleneglycol corresponds to $W'=W'(n')-W2$;
dispense weight corresponds to $W(g)$; and
shot number corresponds to n.

Figure 71:
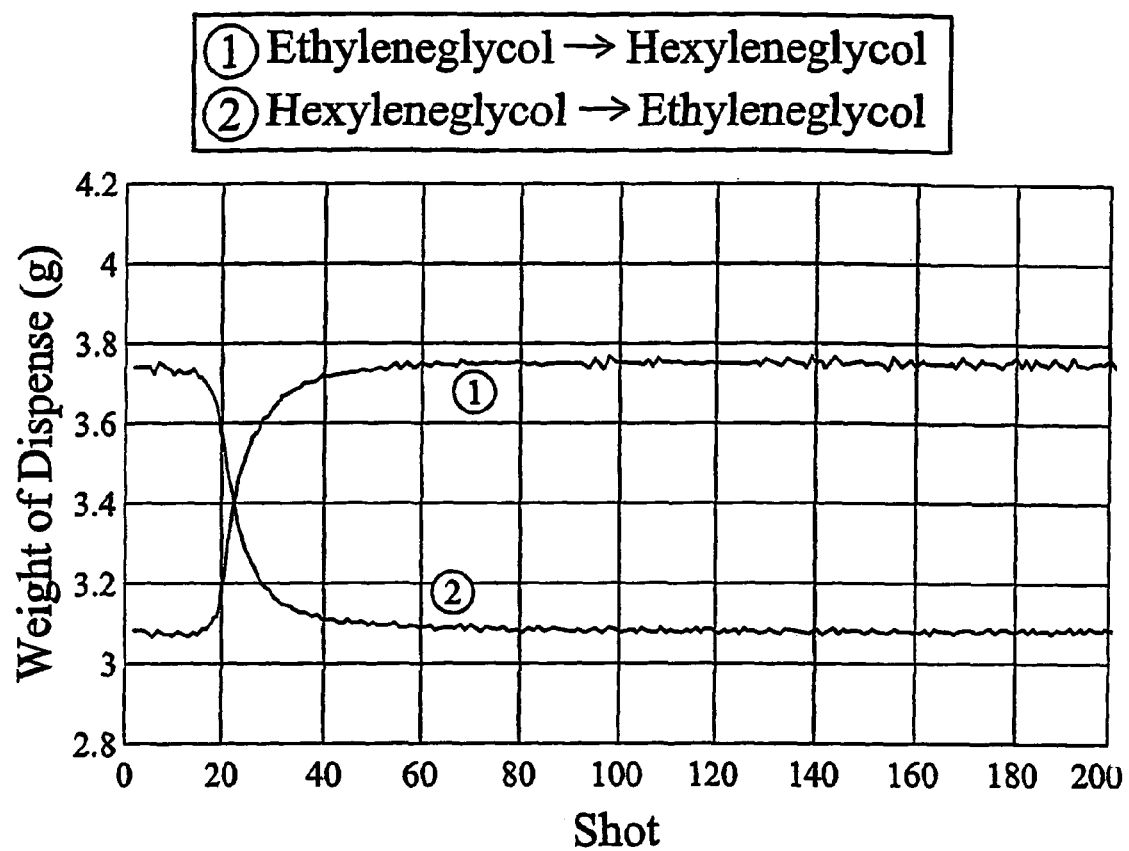
FIG. 71 shows trends for the dispense weight [W, W'] as a function of the shot number for the first filter.
Figure 72:
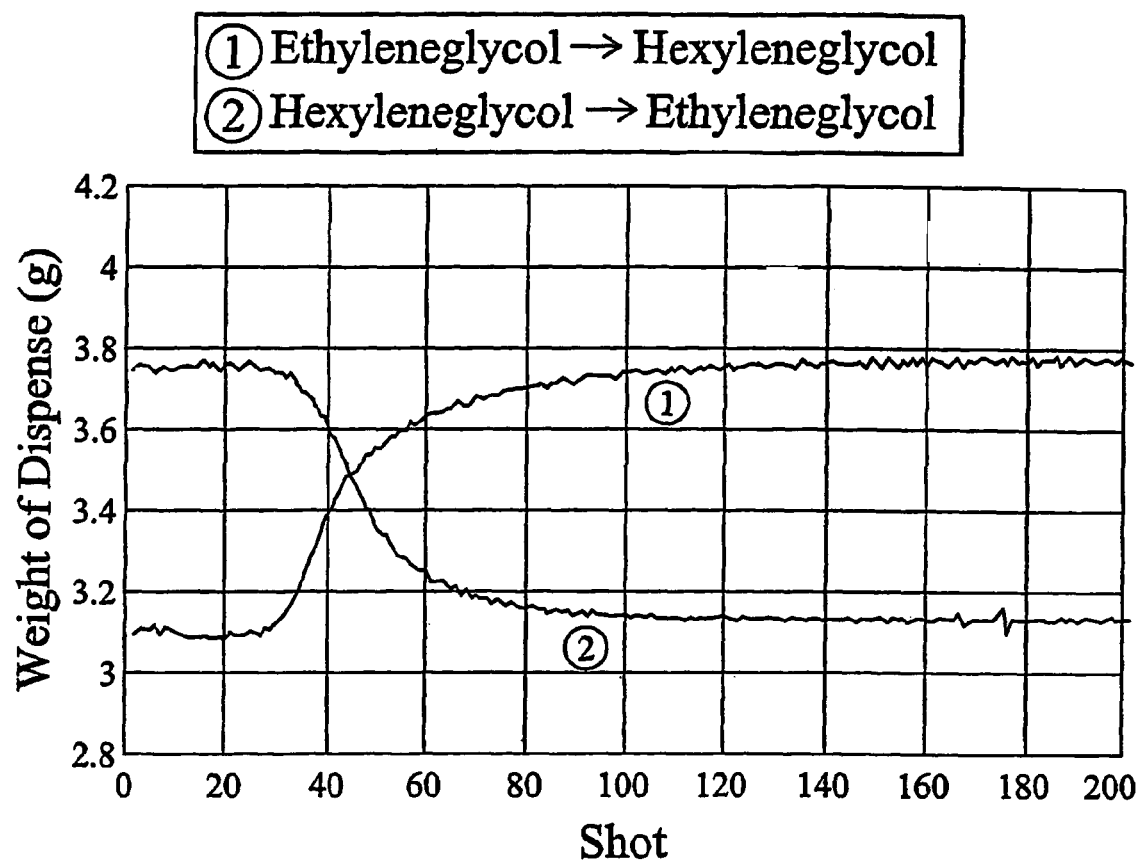
FIG. 72 shows trends for the dispense weight [W, W'] as a function of shot number for the third filter.

FIGS. 71 and 72 show that it takes 60 shots for the first filter 310 and 140 shots for the third filter 314 until the dispense weight reaches a stable level. It takes 80 shots until the dispense weight reaches a stable level for the second filter 312.

Figure 73:
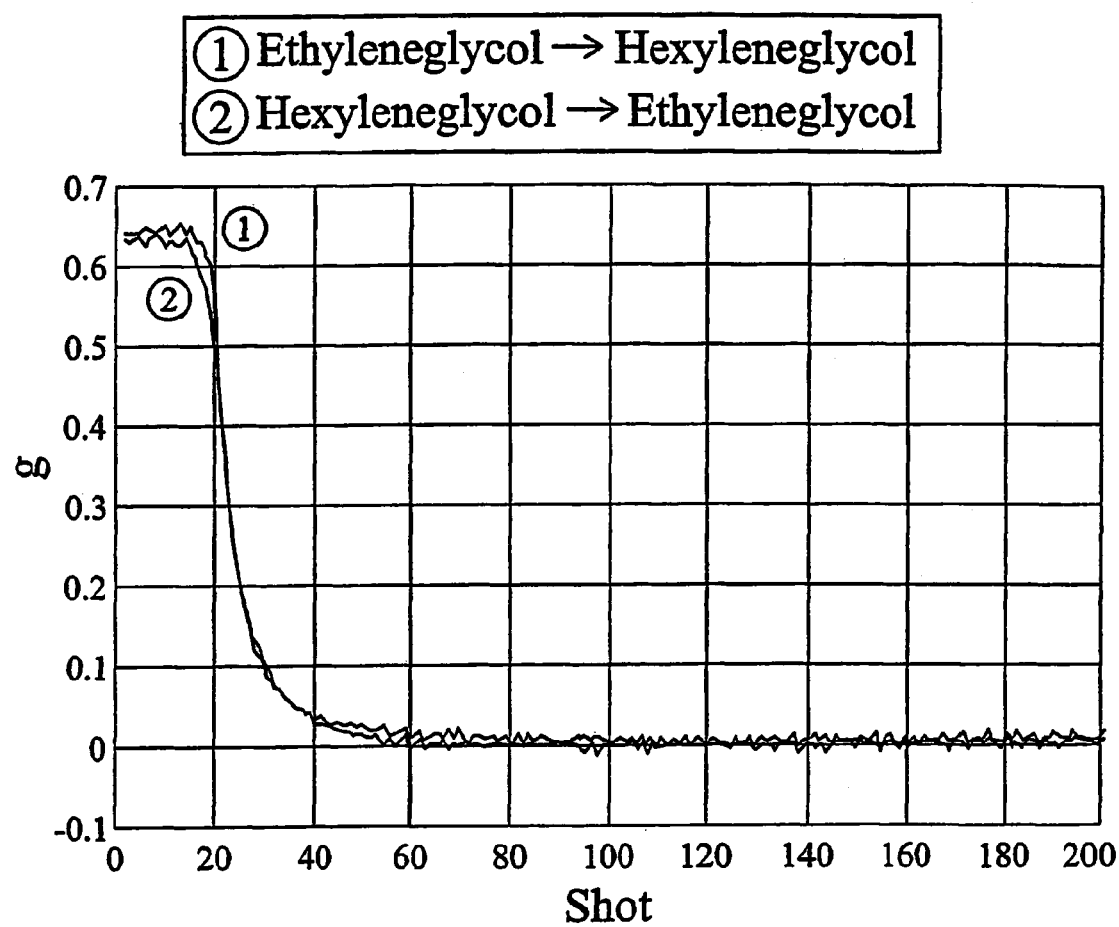
FIG. 73 shows differences of dispense weight [W, W'] between the dispense weights [W(n), W'(n')] and weights at each saturation point [W1, W2] as a function of shot number for the first filter.
Figure 74:
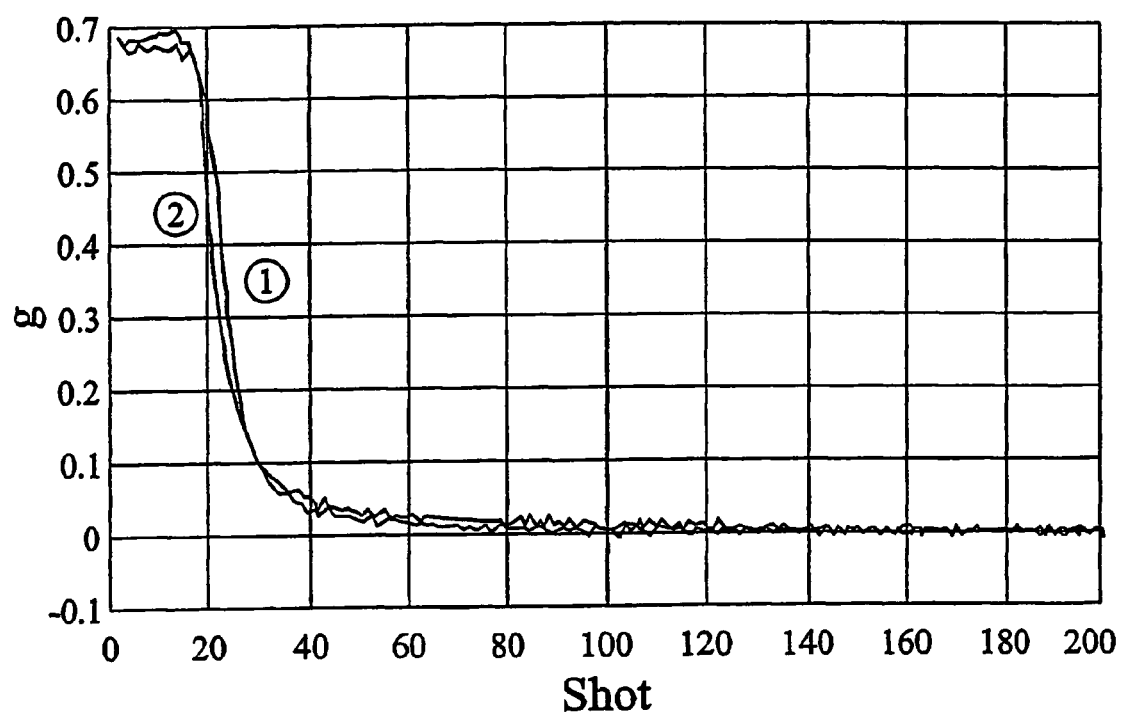
FIG. 74 shows differences of dispense weight [W, W'] between the dispense weights [W(n), W'(n')] and weights at each saturation point [W1, W2] as a function of shot number for the second filter.
Figure 75:
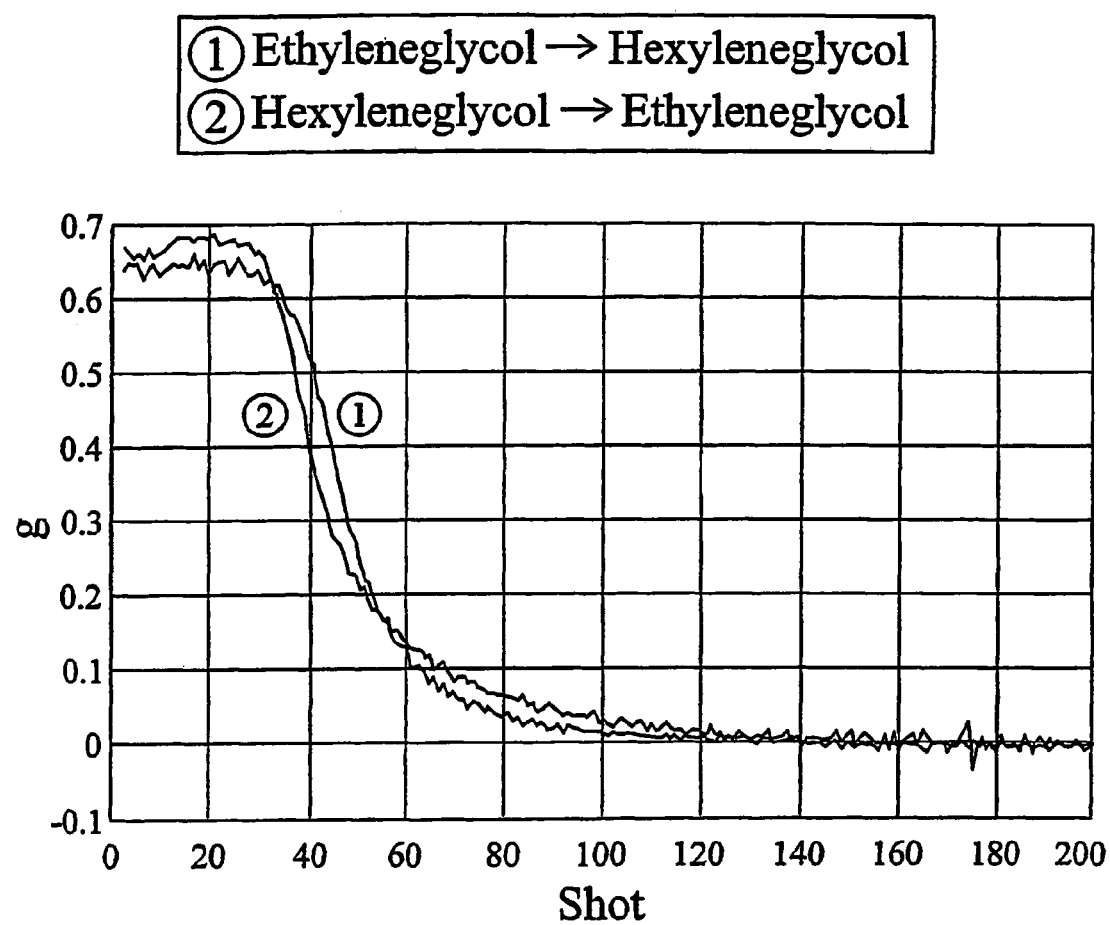
FIG. 75 shows differences of dispense weight [W, W'] between the dispense weights [W(n), W'(n')] and weights at each saturation point [W1, W2] as a function of shot number for the third filter.

In FIGS. 73-75, the areas enclosed by the x- and y-axes and the data profiles indicate the total weight for the displacement. In FIGS. 73 and 74, the profiles and values from hexyleneglycol to ethyleneglycol and from ethyleneglycol to hexyleneglycol were very close. In FIG. 75, the profiles were a bit further but the values were almost the same. The displacement volume from ethyleneglycol to hexyleneglycol must be equal to that from hexyleneglycol to ethyleneglycol in order to displace all of the liquid. Therefore, all of the filters allow most of the liquid to be displaced.

Example 2

Figure 76:
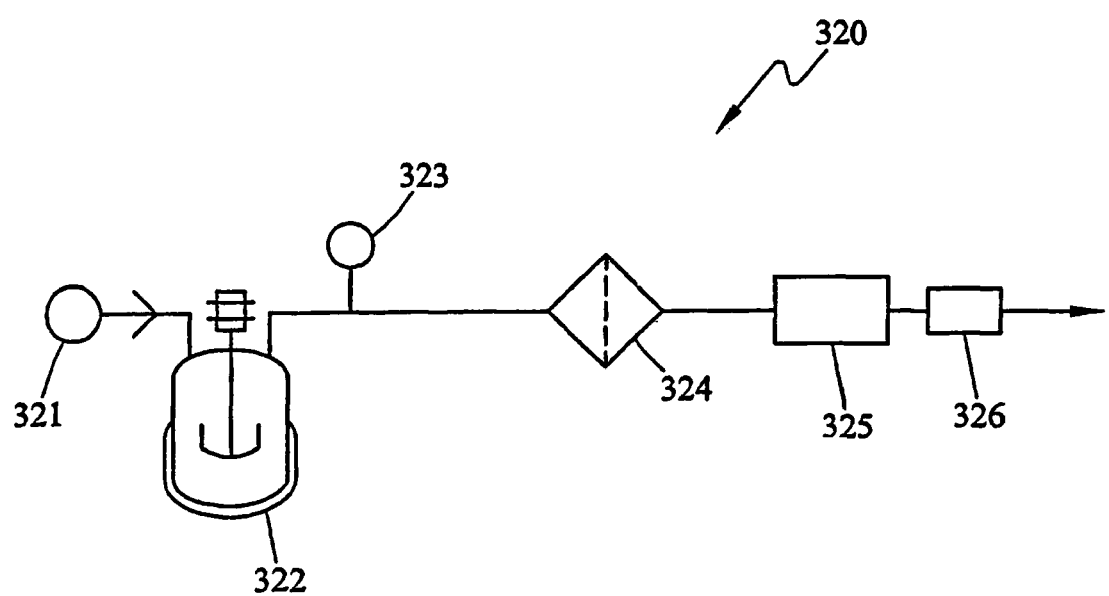
FIG. 76 shows another test system.

A test system 320 shown in FIG. 76 is used to determine bubble and particle counts downstream of the first filter, second filter and third filter of Example 1. The test system includes a source 321 of air, a pressure tank 322, a pressure gauge 323, the test filter 324, a particle counter 325 (e.g., a RION KS-16F), and a flow meter 326. The test liquid is the hexyleneglycol of Example 1.
The test procedure is as follows:
the test liquid is loaded into the tubing and the test filter;
after venting, the liquid is passed through the test filter to the particle counter, which is started simultaneously just after venting; and
the bubble and particle counts for bubbles/particles greater than 0.1 and 0.2 micron were measured as a function of time at a 10 mL/min flow rate.

Figure 77:
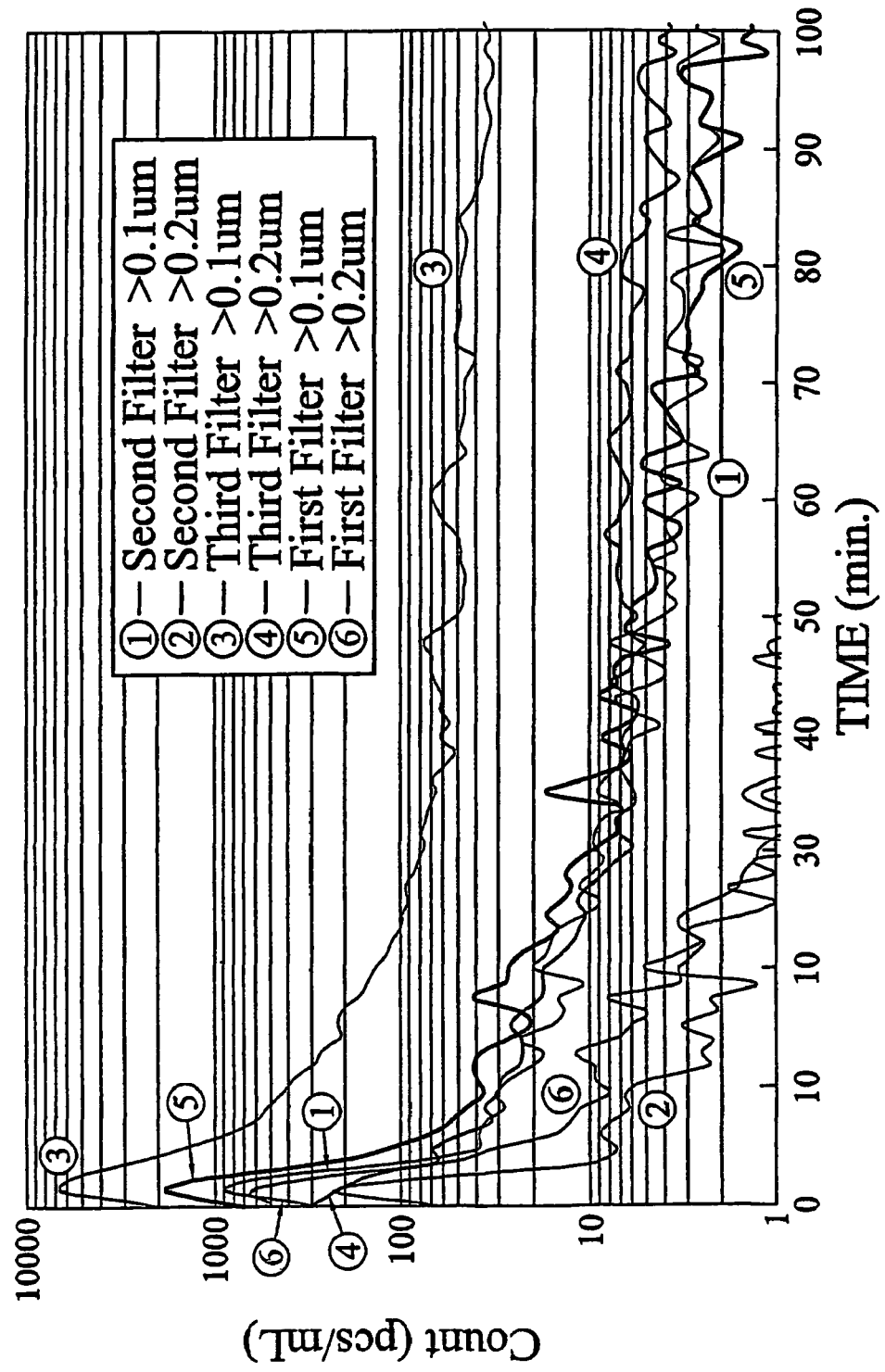
FIG. 77 shows the bubble and particle counts on the downstream side of test filters in the test system of FIG. 76.

As shown in FIG. 77, the first and second filters showed a quick drop for the downstream particles. The first and second filters have a smaller filtration area than the third filter and contain less air initially than the third filter. This difference in filtration area may be the cause of the difference in the initial purge. The first and second filters, which are smaller than the third filter, more quickly reduce the bubble/particle counts downstream of the filter. Thus, the first and second filters better reduce waste time and volume during photoresist dispense.

The present invention has been described in terms of several embodiments. However, the invention is not limited to these embodiments. One or more of the features of one embodiment may be eliminated or combined with one or more of the features of another embodiment without departing from the scope of the invention. Further, entirely different embodiments may be envisioned, particularly in light of the foregoing teachings. Accordingly, the invention includes all variations and modifications encompassed with the scope of the attached claims.

The invention claimed is:
1. A filter comprising: a housing including a head and a bowl, the head having an inlet, an outlet, and a vent, wherein the head having the inlet, the outlet, and the vent is permanently attached to the bowl and the bowl includes a side wall having an interior and a bottom wall having an interior, wherein the inlet includes a first fitting on the housing in the head and extends through said sidewall and into said interior at said bottom wall, and the outlet includes a second fitting on the housing in the head and spaced from the first fitting, and wherein the housing further includes a filter cartridge chamber, and a filter cartridge permanently positioned in the filter cartridge chamber errand bonded to the housing, the filter cartridge having an exterior and a bottom and including a filter element having a hollow interior and a blind end cap sealed to a lower end of the filter element, wherein the inlet fluidly communicates with one of the exterior and the interior of the filter cartridge, the outlet fluidly communicates with the other of the exterior and the interior of the filter cartridge, and the vent vents gas from the housing, wherein the interior of the side wall of the bowl fits around the exterior of the filter cartridge, defining an annular channel between the interior of side wall and the exterior of the filter cartridge, wherein the bottom of the filter cartridge includes a surface which is inclined upwardly toward the annular channel, and wherein the interior of the bottom wall of the bowl includes a surface which faces the bottom surface of the filter cartridge and is inclined upwardly toward the annular channel.

2. The filter of claim 1 wherein the inlet, outlet, and vent are on top of the filter.

3. The filter of claim 1 wherein the inlet fluidly communicates with the exterior of the filter cartridge and the outlet fluidly communicates with the interior of the filter cartridge.

4. The filter of claim 1 further comprising a vent space extending between the annular channel and the vent.

5. The filter of claim 4 wherein the head has an interior and the vent space extends between the interior of the head and the top of the filter cartridge.

6. The filter of claim 1 wherein the filter cartridge includes an open end cap sealed to an upper end of the filter element, the upper open end cap being attached to the head.

7. The filter of claim 1 wherein the bottom surface of the filter cartridge and the interior bottom surface of the bowl are conical.

8. The filter of claim 1 further comprising a lower flow channel between the bottom surface of the filter cartridge and the interior bottom surface of the bowl, the lower flow channel extending upwardly from the bottom of the filter cartridge toward the bottom of the annular channel.

9. The filter of claim 1 wherein the bottom surface of the filter cartridge contacts the interior bottom surface of the bowl.

10. The filter of claim 1 wherein the bottom surface of the filter cartridge and the interior bottom surface of the bowl comprise mating shapes which position the filter cartridge in the bowl.

11. The filter of claim 1 wherein the first fitting is located on top of the filter and defines a first opening in the housing, wherein the second fitting is located on top of the filter and defines a second opening in the housing, and wherein the first and second fittings are spaced from one another along the top of the filter and the first and second openings are separate from one another.

12. The filter of claim 11 wherein the vent includes a third fitting on top of the filter defining a third opening in the housing and wherein the third fitting is spaced along the top of the filter from each of the first and second fittings and the third opening is separate from each of the first and second openings.

13. The filter of claim 1 wherein the first fitting and the second fitting each comprise a receptacle.

14. The filter of claim 13 wherein the vent includes a third fitting defining a third opening in the housing, and wherein the third fitting is spaced from each of the first and second fittings along the top of the filter and the third opening is separate from each of the first and second openings.

15. The filter of claim 1 wherein the filter element has an outer periphery, wherein the blind end cap extends completely across the filter element to the outer periphery and seals the lower end and the hollow interior of the filter element and wherein the blind end cap has a bottom surface which comprises the inclined surface of the filter cartridge and extends upwardly along the lower end of the filter element toward the exterior of the filter cartridge and the annular channel.

16. A filter comprising: a housing including a head and a bowl, the head having an inlet, an outlet, and a vent, wherein the head having the inlet, the outlet, and the vent is permanently attached to the bowl and the bowl includes a side wall having an interior and a bottom wall having an interior, wherein the inlet, the outlet, and the vent are on top of the filter, and wherein the inlet includes a first fitting on the housing in the head and extends through said sidewall and into said interior at said bottom wall, and the outlet includes a second fitting on the housing in the head and spaced from the first fitting, the housing further including a filter cartridge chamber, and a filter cartridge permanently positioned in the filter cartridge chamber errand bonded to the housing, the filter cartridge having an exterior and a bottom and including a pleated filter pack having a hollow interior, a blind end cap sealed to a lower end of the filter pack, and an open end cap sealed to an upper end of the filter pack, the open end cap being joined to the head, wherein the inlet fluidly communicates with the exterior of the filter cartridge, the outlet fluidly communicates with the interior of the filter cartridge, and the vent vents gas from the housing, wherein the interior of the side wall of the bowl fits around the exterior of the filter cartridge and defines an annular channel between the interior of the side wall and the exterior of the filter cartridge, wherein the bottom of the filter cartridge includes a surface which is inclined upwardly toward the annular channel, and wherein the interior of the bottom wall of the bowl includes a surface which faces the bottom surface of the filter cartridge and is inclined upwardly towards the annular channel.

17. The filter of claim 16 further comprising a vent space extending between the annular channel and the vent.

18. The filter of claim 16 wherein the head has an interior and the vent space extends between the interior of the head and the top of the filter cartridge.

19. The filter of claim 16 wherein the bottom surface of the filter cartridge and the interior bottom surface of the bowl are conical.

20. The filter of claim 16 further comprising a lower flow channel between the bottom surface of the filter cartridge and the interior bottom surface of the bowl, the lower flow channel extending upwardly from the bottom of the filter cartridge toward the bottom of the annular channel.

21. The filter of claim 16 wherein the bottom surface of the filter cartridge contacts the interior bottom surface of the bowl.

22. The filter of claim 16 wherein the bottom surface of the filter cartridge and the interior bottom surface of the bowl comprise mating shapes which position the filter cartridge in the bowl.

23. The filter of claim 16 wherein the first fitting defines a first opening in the housing, wherein the second fitting defines a second opening in the housing, and wherein the first and second fittings are spaced from one another along the top of the filter and the first and second openings are separate from one another.

24. The filter of claim 16 wherein the first fitting and the second fitting each comprise a receptacle.

25. The filter of claim 16 wherein the blind end cap extends completely across and seals the lower end and the hollow interior of the filter element and wherein the blind end cap has a bottom surface which comprises the inclined bottom surface of the filter cartridge and extends upwardly along the lower end of the filter element toward the exterior of the filter cartridge.

26. A filter comprising: a housing including a head and a bowl, the head having an inlet, an outlet, and a vent, wherein the head having the inlet, the outlet, and the vent is permanently attached to the bowl, wherein the bowl includes a side wall having an interior and a bottom wall having an interior, wherein the inlet includes a first fitting on the housing in the head on top of the filter defining a first opening in the housing and extends through said sidewall and into said interior at said bottom wall, wherein the outlet includes a second fitting on the housing in the head on top of the filter defining a second opening in the housing, and wherein the first fitting is spaced along the top of the housing from the second fitting and the first opening is separate from the second opening, the housing further including a filter cartridge chamber, and a filter cartridge permanently positioned in the filter cartridge chamber of=and bonded to the housing, the filter cartridge having an exterior and including a filter pack having a plurality of pleats, a lower end, a hollow interior, and an outer periphery and an end cap having a bottom, the end cap extending across the lower end of the filter pack to the outer periphery of the filter pack and being sealed to the pleats at the lower end of the filter pack, wherein the inlet fluidly communicates with one of the exterior and the interior of the filter cartridge, the outlet fluidly communicates with the other of the exterior and the interior of the filter cartridge, and the vent vents gas from the housing, wherein the interior of the side wall of the bowl fits around the exterior of the filter cartridge, defining an annular channel between the interior of the side wall and the exterior of the filter cartridge, wherein the bottom of the end cap includes a surface which is inclined upwardly toward the annular channel, and wherein the interior of the bottom wall of the bowl includes a surface which faces the bottom surface of the end cap and is inclined upwardly toward the annular channel, the bottom surface of the end cap and the interior bottom surface of the bowl defining a lower channel which extends upwardly toward the bottom of the annular flow channel.

27. The filter of claim 26 wherein the vent includes a third fitting on top of the filter defining a third opening in the housing, the third fitting being spaced along the top of the housing from the first and second fittings and the third opening being separate from the first and second openings, wherein the inlet fluidly communicates with the exterior of the filter cartridge and the outlet fluidly communicates with the interior of the filter cartridge, and wherein the head includes a vent passage extending between the annular channel and the vent.

* * * * *